(12) United States Patent
Goeringer et al.

(10) Patent No.: US 11,494,761 B2
(45) Date of Patent: Nov. 8, 2022

(54) SYSTEMS AND METHODS FOR DIGITAL ASSET SECURITY ECOSYSTEMS

(71) Applicant: CABLE TELEVISION LABORATORIES, INC, Louisville, CO (US)

(72) Inventors: Steven John Goeringer, Westminster, CO (US); Brian Alexander Scriber, Denver, CO (US); Arianne Hinds, Louisville, CO (US); Michael Sprenger, Boulder, CO (US); Robert Michael Lund, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 330 days.

(21) Appl. No.: 15/476,098

(22) Filed: Mar. 31, 2017

(65) Prior Publication Data

US 2017/0206523 A1    Jul. 20, 2017

Related U.S. Application Data

(63) Continuation-in-part of application No. 15/376,375, filed on Dec. 12, 2016, which is a (Continued)

(51) Int. Cl.
*G06Q 20/38*    (2012.01)
*G06Q 20/40*    (2012.01)
(Continued)

(52) U.S. Cl.
CPC ......... *G06Q 20/3829* (2013.01); *G06F 21/45* (2013.01); *G06F 21/645* (2013.01); *G06Q 20/3827* (2013.01); *G06Q 20/409* (2013.01)

(58) Field of Classification Search
CPC .......... G06Q 20/3829; G06Q 20/3827; G06Q 20/409; G06F 21/45; G06F 21/645
See application file for complete search history.

(56) References Cited

U.S. PATENT DOCUMENTS 6,226,618 B1 *   5/2001   Downs .................... H04L 67/18
                                                                 705/51
6,601,172 B1 *   7/2003   Epstein ................. H04L 9/3247
                                                                 713/180

(Continued)

FOREIGN PATENT DOCUMENTS

WO    WO-2017027648 A1 *   2/2017   ............. G06Q 10/08

OTHER PUBLICATIONS

Jasmin Cosic et al., (Im)Proving Chain of Custody and Digital Evidence Integrity with Time Stamp, May 2010, IEEE Xplore, pp. 1226-1230 (Year: 2010).*

*Primary Examiner* — Neha Patel
*Assistant Examiner* — Nilesh B Khatri
(74) *Attorney, Agent, or Firm* — Armstrong Teasdale LLP

(57) ABSTRACT

A digital asset security device, includes an asset capture unit configured to electronically capture a digital asset, a processor configured to digitally sign the captured asset, a memory configured to store a digitally signed asset from the processor, and a hashing module in communication the asset capture unit, the processor, and the memory, and configured to provide a cryptographic hash to one or more of the captured asset and the digitally signed asset.

10 Claims, 24 Drawing Sheets

Related U.S. Application Data continuation-in-part of application No. 15/345,411, filed on Nov. 7, 2016.

(60) Provisional application No. 62/315,841, filed on Mar. 31, 2016, provisional application No. 62/266,592, filed on Dec. 12, 2015, provisional application No. 62/252,097, filed on Nov. 6, 2015.

(51) Int. Cl.
*G06F 21/64* (2013.01)
*G06F 21/45* (2013.01)

(56) References Cited

U.S. PATENT DOCUMENTS

| | | | |
|---|---|---|---|
| 7,136,487 B1* | 11/2006 | Schon | G06Q 50/16 380/229 |
| 9,300,678 B1* | 3/2016 | Stack | G06F 21/6218 |
| 2006/0122946 A1* | 6/2006 | Fahmy | G06Q 20/3829 705/71 |
| 2007/0283158 A1* | 12/2007 | Danseglio | G11B 20/00086 713/180 |
| 2008/0046755 A1* | 2/2008 | Hayes | H04L 9/3271 713/187 |
| 2011/0184910 A1* | 7/2011 | Love | G06F 16/2477 707/610 |
| 2011/0202687 A1* | 8/2011 | Glitsch | H04N 21/2407 709/248 |
| 2015/0161153 A1* | 6/2015 | Gheith | G06F 3/067 707/695 |
| 2015/0256784 A1* | 9/2015 | Malone | H04N 5/44 348/552 |
| 2015/0262137 A1* | 9/2015 | Armstrong | G06Q 20/065 705/41 |

\* cited by examiner

SYSTEMS AND METHODS FOR DIGITAL ASSET SECURITY ECOSYSTEMS

CROSS REFERENCE TO RELATED APPLICATIONS

This application is a continuation-in-part of U.S. patent application Ser. No. 15/376,375, filed Dec. 12, 2016, which claims the benefit of and priority to U.S. Provisional Patent Application Ser. No. 62/266,592, filed Dec. 12, 2015, and also U.S. patent application Ser. No. 15/345,411, filed Nov. 7, 2016, which claims the benefit of and priority to U.S. Provisional Patent Application Ser. No. 62/252,097, filed Nov. 6, 2016, all of which disclosures are herein incorporated by reference in their entirety. This application further claims the benefit of and priority to U.S. Provisional Patent Application Ser. No. 62/315,841, filed Mar. 31, 2016, the disclosure of which is also herein incorporated by reference in its entirety.

BACKGROUND

The field of the disclosure relates generally to network transaction security systems, and more particularly, to a security ecosystem for digital assets.

A large amount of transactions performed over a network are not considered to be secure, and conventional transaction security solutions can be extremely complex. Moreover, conventional mechanisms for transaction security that may be considered secure at the present are likely to be considered less secure in the future as new exploitation techniques are discovered. When one security for a transaction has been breached, it can be especially difficult to prove that the transaction itself was compromised, or when the compromise occurred.

Blockchaining technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained.

The blockchain is a core component of the digital currency bitcoin (sometimes referred to as "crypto-currency"), where the blockchain serves the public ledger for all transactions. Bitcoin transactions allow every compatible client to connect to a network, send transactions to the network, verify the transactions, and compete to create blocks of the blockchain. The bitcoin transaction, however, involve only the exchange of currency between client and the network. Bitcoin transactions to not involve transactions and negotiations between two individual clients directly, and bitcoin clients do not transfer content beyond the currency value itself. Customers and users of media service providers, on the other hand, are increasingly sharing access to media services between each other. A common form of such access sharing is exhibited where two customers and/or users share account credentials (logon IDs and passwords) between one another. In the cable industry, this type of sharing is often referred to as "cord cheating."

BRIEF SUMMARY

In an embodiment, a digital asset security device, includes an asset capture unit configured to electronically capture a digital asset, a processor configured to digitally sign the captured asset, a memory configured to store a digitally signed asset from the processor, and a hashing module in communication the asset capture unit, the processor, and the memory, and configured to provide a cryptographic hash to one or more of the captured asset and the digitally signed asset.

In an embodiment, a digital asset ecosystem includes an electronic processing device configured to capture a digital asset and apply a cryptographic hash to the digital asset at a time of asset capture, and an electronic registry configured to receive a transaction from the electronic processing device. The transaction includes the cryptographic hash and metadata relating to the digital asset. The ecosystem further includes an electronic media viewer for experiencing digital content based on the digital asset, and an electronic network configured to receive a combination of the digital asset, the cryptographic hash, and the metadata from the electronic processing device and distribute the combination to the electronic media viewer as the digital content.

In an embodiment, a method of providing a digital signature to a digital asset, includes the steps of electronically capturing a digital asset utilizing an electronic capture device, digitally signing the captured asset with a cryptographic hash, and storing the digitally signed asset in a memory of the electronic capture device.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
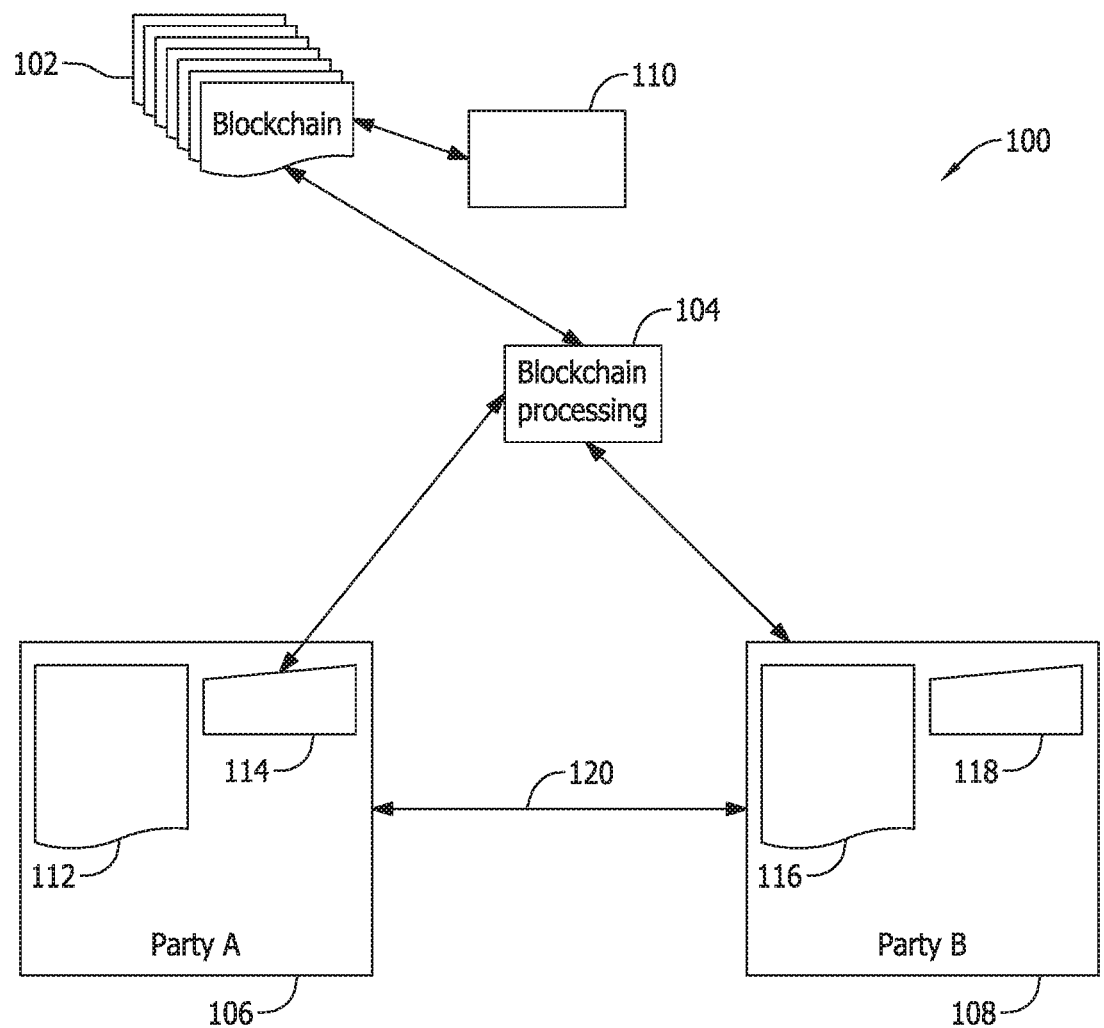
FIG. 1 is a schematic illustration of an exemplary blockchain implementation for a content transaction, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The present inventors have discovered that blockchaining techniques can be utilized better secure content sharing and transactions between users and customers of a content provider. Although the principles described herein may be applicable to simple currency transactions or negotiations (e.g., bitcoin) between 2 parties, the embodiments described below are even more advantageously applied to transactions where the non-financial content itself is the "currency" of the exchange between customers/users. Such nonfinancial content, for purposes of this discussion, includes, but is not limited to, shared media, software, copyrighted works, licenses, security credentials and other forms of transferable content that are not strictly currency only. Such content is also referred to as "licensed-burdened content," and or "valuable encumbered content." For simplification of discussion of the embodiments described herein, this concept will also be referred to as "Content as Currency," or CAC.

As described above, blockchaining utilizes cryptographic techniques to create digital ledgers of transactions. According to the systems and methods described herein, the application of blockchaining CAC transactions, and to increase transaction security over networks in general has wide applicability to the cable industry, as well as other networks over which transactions occur. These blockchaining techniques are further useful in measurement and isolation of content and bandwidth piracy. In addition to CAC transactions, the present embodiments also significantly increase transactional security in areas of, without limitation: enhanced content protection, by improving measurability and traceability of how media flows through networks; digital rights management (DRM); secure imaging; distributed denial of service (DDoS) mitigation and/or attacks; scalable Internet of Things (IoT) security solutions; supply chain integrity; device registration, and enhanced DRM and data over cable service interface specification (DOCSIS) security; enhanced content protection; connectivity negotiation; dynamic service creation or provisioning; service authentication; virtualization orchestration; and billing transformation.

With respect to CAC transactions in particular, the present embodiments allow the blockchain to be implemented to secure media sharing for customer driven applications. As explained further below, such implementations are applicable to both centralized and decentralized models, and can also be applied to secure hardware/software binding in virtualized environments and virtualization orchestration using secure hardware/software binding.

The present embodiments serve to both incentivize and monetize media sharing in significantly new ways that are not considered by conventional blockchain techniques. The present embodiments are further advantageous over conventional blockchain transactions in that the content itself can function as a currency transaction (CAC). Accordingly, the disclosed blockchain techniques are applied to enable, track, and report content transactions. Subscribers of media services, for example, can receive credits from a content provider for transactions. When such subscribers choose to view or buy content (in the case of media), the subscribers expend credits using a cipher transaction, which records on or more of the time, device ID, user ID, content ID, content license level, and other information related to the transaction and the respective electronic devices utilized to purchase or view the content. The transaction will then be reported by both the service provider and the user's device (hardware or software system) to a blockchain processing system (distributed, centralized, or other) that will add the cipher transaction to a blockchain ledger. Users can thus share content with other subscribers using a similar process. The rate of exchange of credits can vary when sharing according to the service providers marketing goals. Furthermore, the service provider may grant new credits to users who share content.

The value of the blockchain ledger in this CAC transaction environment is significant. The blockchain ledger can be used in reconciliation of content agreements between content providers and service providers. The embodiments herein are therefore further useful for data analytics on viewing practices, distribution patterns, media interest levels, communities of interest, and similar analytics that are applicable to CAC transactions. Under the embodiments herein, a particular subscriber's reputation and/or history can be a factor in granting media credits from a provider. Conversely, subscribers with a negative payment history can be restricted or prevented from receiving or sharing content, and users in communities of interest that have a lower payment probability can be similarly restricted, or alternatively receive fewer credits.

FIG. 1 is a schematic illustration of an exemplary blockchain system 100 implementing a content transaction between parties. System 100 includes a blockchain 102, a blockchain processor 104, a first party 106 (party A), and a second party 108 (party B). In an exemplary embodiment, system 100 further includes a data science subsystem 110. Data science subsystem 110 is, for example, an external memory device or a decentralized data storage center, as blockchains typically do not store large amounts of data. In the exemplary embodiment, first party 106 is an electronic device that further includes a first memory 112 and a first processor 114, and second party 108 is also an electronic device that includes a second memory 116 and a second processor 118.

In operation, system 100 utilizes blockchain 102 and blockchain processor 104 to secure a transaction 120 between first party 106 and second party 108. In an exemplary embodiment, transaction 120 is a CAC transaction, as described above, and transaction 120 represents a negotiation between first party 106 and a second party 108 which, for example, may involve an offer from one of the parties to the other to deliver content, and acceptance by the other party, and a transfer of consideration therebetween. In the exemplary embodiment, first memory 112 and second memory 116 each are configured to store certificates and other information, including, without limitation, at least one of an envelope ID or transaction ID, a certificate of the respective party A or B, a user ID, a device ID, a media ID or hash, a media uniform resource identifier (URI), timestamps, ratings of the particular party and/or the content to be transferred, terms of agreement between the parties, licenses that may encumber the transferred content, and exchange rate information related to a monetary exchange between parties for the transfer of content.

In further operation, blockchain processor 104 is configured to electronically communicate, for example, over a cable, wired, or wireless electronic network, with respective first and second processors 114, 118. In an exemplary embodiment, party A (i.e., first party 106) initiates transaction 120 as an offer or invitation to share, sell, or transfer (e.g., by gift, information, or other transfer means) encumbered financial or non-financial content with party B (i.e., second party 108). In an alternative embodiment, party B initiates transaction 120 as a request for party A to transfer the encumbered content. In an exemplary embodiment, party B is a subscriber to party A, or vice versa. Alternatively, neither party is a subscriber of the other, but may opt in to transaction 120 upon receiving the initial offer, invitation, or request.

Once transaction 120 is initiated, party A compiles a body of information contained within memory 112 into an envelope, and processor 114 encrypts the envelope, including a media key, with a private key of party A, and submits the encrypted envelope to blockchain processor 104. In an alternative embodiment, party B also compiles and encrypts a similar envelope from information contained within memory 116, and processor 118 submits this other encrypted envelope to blockchain processor 104 as well.

In the exemplary embodiment, blockchain 102 and blockchain processor 104 add unique value to the sharing of CAC content between parties A and B over transaction 120 by actively providing the parties a stake in the supply chain. In conventional blockchain transactions involving only currency (e.g., bitcoin), parties A and B would merely be individual endpoints of a financial transaction with blockchain processor 104. That is, parties A and B would only interact directly blockchain processor 104 in the conventional system, and would not interact with each other, nor would they share encumbered and non-financial CAC content.

According to the exemplary embodiment, in the negotiation of certificates and information, transaction 120 may further include, without limitation, one or more of the following: existing policy terms encumbering, or license rights burdening, the CAC content; active communication between the parties; a transaction scaler or discount (which may apply to special offers are repeated transactions between the parties); a reputation of the parties; and automated policy driven applications that establish boundaries through which the negotiation between the parties can occur.

In an exemplary embodiment, the CAC content may be media content such as a video recording, an audio recording, or other copyrighted or copyrightable work, and the transfer of the CAC content from party A would allow party B the rights to view or otherwise experience the CAC content under the negotiated terms. For transaction 120, blockchain processor 104 is configured to utilize blockchain 102 to allow party A (the assignor, seller, or transferor) to: (a) confirm the negotiated payment or payment terms from party B; (b) verify that any licenses burdening the transferred CAC content are honored; (c) apply a temporal window within which transaction 120 must be completed or which transferred content may be experienced by party B; and (d) render the transferred CAC content transferable a third party by party B. The immutability of blockchain 102 further renders both transaction 120 and the transferred CAC content resistant to piracy and/or other unauthorized uses.

Additionally, utilization of blockchain 102 for transaction 120 also renders it significantly easier for party B (the buyer or transferee) to: (a) legally receive licensed content; (b) confirm the negotiated payment or payment terms to party A; (c) easily determine how long or how many times the transferred CAC content may be viewed or experienced; and (D) further transfer, sell, or gift the received CAC content to third parties subject to the negotiated terms, licenses, and other nonfinancial content transferred over transaction 120. According to the advantageous systems and methods disclosed herein, blockchain technology may be implemented such that the transferred CAC content itself is the "currency" verified by the immutable ledger of the blockchain (e.g. blockchain 102). In one embodiment, the transaction ID associated with transaction 120 may itself be considered the "coin" of the blockchain.

Figure 2:
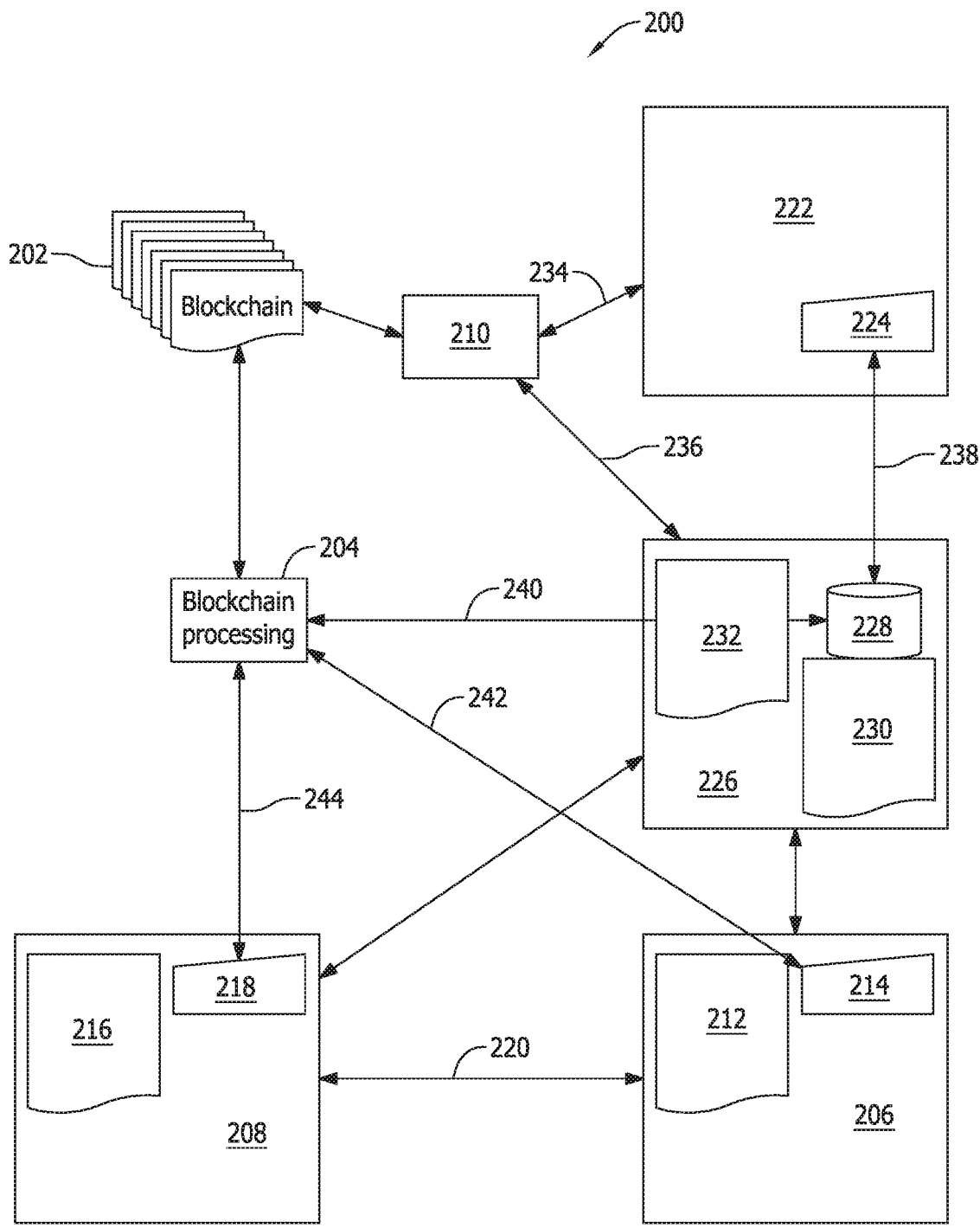
FIG. 2 is a schematic illustration of an alternative blockchain implementation for the content transaction depicted in FIG. 1.

FIG. 2 is a schematic illustration of an alternative blockchain system 200 to implement upon and verify a content transaction between parties. Similar to FIG. 1, system 200 includes a blockchain 202, a blockchain processor 204, a first party 206 (party A), and a second party 208 (party B). In an exemplary embodiment, system 200 further includes a data science subsystem 210, and first party 206 is an electronic device that further includes a first memory 212 and a first processor 214, and second party 208 is also an electronic device that includes a second memory 216 and a second processor 218.

In operation, system 200 utilizes blockchain 202 and blockchain processor 204 to secure a CAC transaction 220 between first party 206 and second party 208, similar to system 100 (FIG. 1). In the embodiment illustrated, CAC transaction 220 is similar to transaction 120, depicted in FIG. 1, and may include all of the parameters and considerations described above. System 200 expands upon system 100 in that it depicts a relationship of CAC transaction 220 between parties A and B, and further consideration of a content owner 222 of a master content 224 that is the subject of transaction 220, and also the presence of a service provider 226, which may be a portion of content owner 222, or a separate entity. In an exemplary embodiment, service provider 226 includes a media storage center 228, an account database 230, and a provider memory 232. Media storage center 228, account database 230, and provider memory 232 may all be integrated into the single media storage center 228, or be separate entities from one another within the control of service provider 228.

In the exemplary embodiment, provider memory 232 is similar to first memory 212 and second memory 216, in that provider memory 232 is configured to store certificates and other information, including, without limitation, at least one of an storage provider ID, a device ID, a media ID, a media uniform resource identifier (URI), timestamps, ratings of the parties (the parties are clients or subscribers of service provider 226) and/or master content 224, as well as licenses that may encumber the transferred content. Alternatively, ratings of the parties may be stored within account database 230, which may also store policy information that may be attached to master content 224 and thereby encumber CAC transaction 220. Optionally, account database 230 may include a processor (not shown) configured to create one or more accounts for individual clients (e.g., parties A, B) and populate the client credentials within account database 230.

In an exemplary embodiment, data science subsystem 210 is configured to be in electronic communication with one or more of content owner 222 and service provider 226. In operation, data science subsystem 210 is further configured to interactively communicate behaviors and/or statistics 234 with content owner 222. Optionally, data science subsystem 210 may also be configured to interactively communicate exchange rates, behaviors, and/or statistics 236 with service provider 226.

In further operation, system 200 may function much like system 100, in that the transaction ID (the "coin") and an envelope may be created by the initiation of transaction 220 between parties A and B. Alternatively, a media ID 238 (the "coin") and the envelope may be created by content owner 222 upon providing master content 224. According to this alternative embodiment, service provider 226 is further configured to provide a registration link 240 to register media ID 238 is a blockchain processor 204. In an exemplary embodiment, first party 206 further includes a first submission link 242 configured to allow first party 206 to submit transaction 220 to blockchain processor 204, and second party 208 further includes a second submission link 244 configured to allow second party 208 to also submit transaction 222 blockchain processor 204.

In the exemplary embodiment depicted in FIG. 2, for CAC transaction 220, implementation of blockchain 202 and blockchain processor 204 for system 200 confers upon parties A (assignor/seller) and B (buyer) all of the benefits and advantages realized by implementation of system 100, depicted in FIG. 1, above, except for the consideration of transaction 220 specifically including third parties, such as content owner 222 and service provider 226. System 200 further confers similar benefits specifically on these third parties. For example, utilization of blockchain 102 allows content owner 222 to: (a) confirm the payment or payment terms of its share of CAC transaction 220 that is transferred from party A to party B (or additional parties); (b) verify that any licenses burdening master content 224 are honored in CAC transaction 220; (c) apply a temporal window within which transaction 220 must be completed or which master content 224 may be experienced by parties A and/or B; and (d) set the transferability terms of the transferred CAC content. As with system 100, the immutability of blockchain 202 renders both transaction 220 and the transferred CAC content resistant to piracy and/or other unauthorized uses, which is of particular interest to content owner 222. Additionally, utilization of blockchain 202 significantly enhances the ability of content owner 222 2 audit the uses of master content 224 and track which parties may be experiencing such content.

Furthermore, utilization of blockchain 202 for CAC transaction 220 also renders it significantly easier for service provider 226 to: (a) legally receive licensed content from content owner 222; (b) confirm the payment or payment terms of its share of CAC transaction 220 that is transferred from party A to party B (or additional parties); (c) easily determine how long or how many times the transferred CAC content has been viewed or experienced; and (D) more easily allow for the transfer, sale, or gifting of the licensed CAC content to additional users, devices, and/or peers, and all subject to the negotiated terms, licenses, and other nonfinancial content transferred over transaction 220.

Through implementation of blockchain 202, service provider 226 further gains the benefit of additional control of the distribution of master content 224, as such content is encumbered and transferred among clients and subscribers of service provider 226. Service provider 226 can rely on the immutability of blockchain 202 to provide content owner 222 verifiable information regarding the use of master content 224, but without necessarily having to share statistics regarding individual viewers or users which may be subscribers to service provider 226. In an exemplary embodiment, service provider 226 may further offer its subscribers, according to the terms of a subscription or purchase (which may also encumber the CAC content of CAC transaction 220), a media budget against which individual subscribers (e.g. parties A, B) may exchange media in further consideration of such parameters as a variable exchange rate, and exchange rate that is negotiated or based on demand, or an exchange rate based on the particular licensing and/or burden restrictions on the CAC content.

Figure 3:
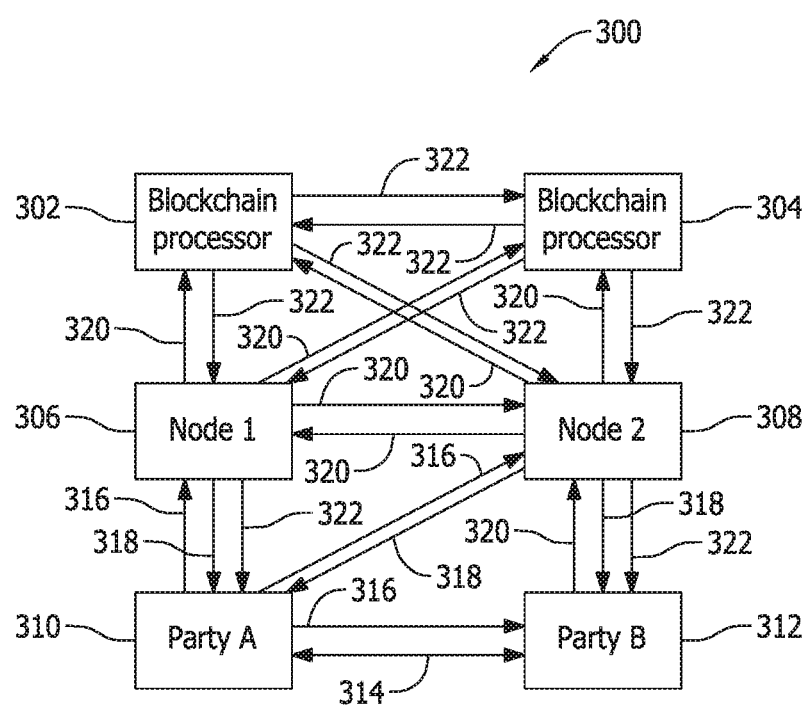
FIG. 3 is a schematic illustration of an exemplary blockchain implementation for the content transaction depicted in FIGS. 1 and 2 according to a distributed model.

FIG. 3 is a schematic illustration of an exemplary blockchain system 300 that may be implemented for the CAC transactions depicted in FIGS. 1 and 2, according to a distributed model. For ease of explanation, some of the elements from FIGS. 1 and 2 are not shown in FIG. 3 (or FIGS. 4 and 5, below), but a person of ordinary skill in the art, after reading and comprehending the present disclosure, will understand how and where such additional elements to be implemented within system 300, and the system is further described below.

In an exemplary embodiment, system 300 includes a first blockchain processor 302, a second blockchain processor 304, a first node 306, a second node 308, a first party 310 (party A), and a second party 312 (party B). System 300 utilizes a distributed model to verify a negotiated CAC transaction 314 between parties A and B. System 300 further includes broadcasts 316 of CAC transaction 314 containing an envelope, acknowledgments 318 of the transaction validity, transaction propagations 320 between the several entities, and iteration propagations 322 of each processing iteration of the blockchain.

In the distributed model illustrated in FIG. 3, blockchaining technology is thus applied to enable, track, and report CAC content transactions between parties (i.e., parties A and B). The advantageous model of system 300 thereby allows for the enabling, providing, exchanging, and/or transferring of the rights to view/experience content subject to CAC transaction 314. For example, in operation, when a party chooses to view or buy content, a negotiation occurs between party A and party B that may result in one or more of a cipher transaction, the recordation of the time, and/or communication of a device ID, user ID, content ID, content license level, and/or other information that enables the providing, exchanging, or transferring the right to view CAC content. In an exemplary embodiment, details of CAC transaction 314 will be compiled into an envelope by Party A, and then submitted to distributed blockchain processing system 300 according to the illustrated model, and then add relevant details of transaction 314 to a distributed blockchain ledger (not shown).

In an exemplary operation of system 300, party A chooses to share, sell, or transfer CAC content to party B. A negotiation (i.e., CAC transaction 314) occurs, which can be based upon policies and/or rules, and parties A and B agree to terms. Party A then compiles a body of information into an envelope, which may include a media key, and may encrypt the envelope, body of information, and media key using a private key of party A. In this example, the envelope may thus form the basis for establishing CAC transaction 314, and the envelope is broadcast (i.e., broadcast 316) to blockchain nodes and parties to which party A is connected. The parties may then further relay details of CAC transaction 314 to other connected nodes and parties (i.e., transaction propagations 320).

Upon receipt of details of CAC transaction 314, first node 306 and second node 308 are configured to validate the transaction using the public key of party A. Once the transaction is validated, first node 306 and second node 308 are configured to transmit an acknowledgment (i.e., acknowledgment 318) to submitting parties A and B. Also upon receipt of details of CAC transaction 314, first blockchain processor 302 and second blockchain processor 304 are further configured to add the details of the transaction to a pending block of the associated blockchain. At an appropriate time interval, processors 302, 304 are also configured to determine the appropriate blockchain among those which may be stored and propagated, which may be, for example, the longest or highest chain. Processors 302, 304 may then append new transactions to the determined blockchain and estimate the next hash. If solved within the appropriate time interval, the solution is propagated (i.e., iteration propagation 322) to connected processors, nodes, and parties, where appropriate. In some instances, parties may not be directly connected to blockchain processors, and thus may not receive iteration propagations.

Figure 4:
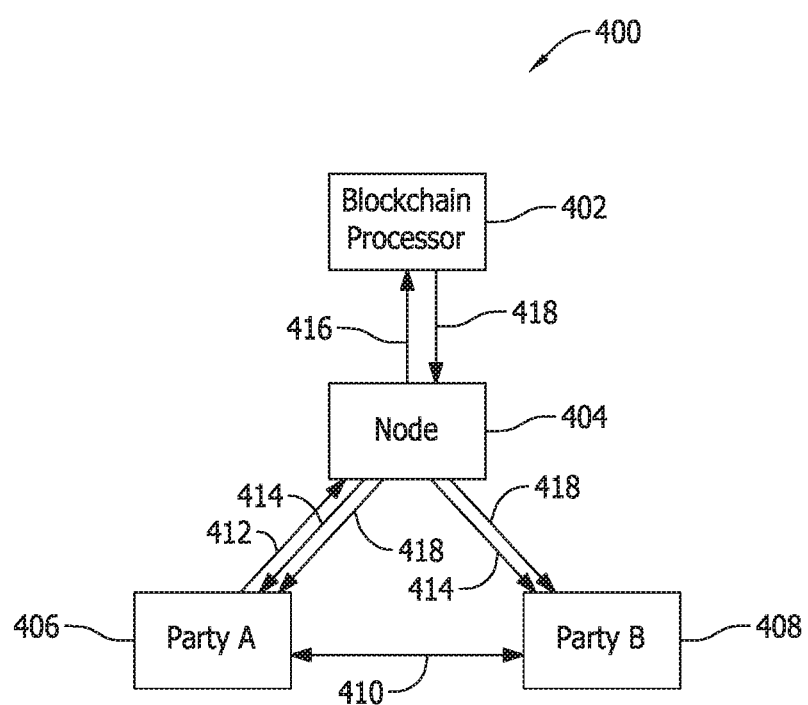
FIG. 4 is a schematic illustration of an exemplary blockchain implementation for the content transaction depicted in FIGS. 1 and 2 according to a centralized model.

FIG. 4 is a schematic illustration of an exemplary blockchain system 400 that may be implemented for the CAC transactions depicted in FIGS. 1 and 2, according to a centralized model. In an exemplary embodiment, system 400 includes a blockchain processor 402, a node 404, a first party 406 (party A), and a second party 408 (party B). System 400 utilizes a centralized model to verify a negotiated CAC transaction 410 between parties A and B. For ease of explanation, system 400 is illustrated as a simplified architecture featuring a single node and a single blockchain processor. In practice, system 400 may include a plurality of redundant nodes and blockchain processors to enhance reliability of the system. In such expanded embodiments, each transaction may be propagated to at least two nodes and at least two blockchain processors, and utilizing reliable transmission protocols.

According to the exemplary centralized model, system 400 further includes a broadcast 412 of CAC transaction 410, containing an envelope, from party A to node 404, acknowledgments 414 of the transaction validity from node 404 to parties A and B, a transaction propagation 416 from node 404 to blockchain processor 402, and transaction acceptances 418 from blockchain processor 402, to node 404, and to parties A and B. This centralized model of system 400 differs from the distributed model of system 300 in that the centralized model allows all information from the parties (e.g., first party 406 and second party 408) to first pass through the node (e.g., node 404) before reaching the blockchain processor (e.g., blockchain processor 402). The centralized model can provide significantly more consistency, and also more control by a content owner and/or service provider over CAC transactions between their subscribers.

In the exemplary centralized model illustrated in FIG. 4, blockchaining is implemented to advantageously enable, track, and report CAC content transactions between parties (i.e., parties A and B). This implementation thus allows for the enabling providing, exchanging, and/or transferring the right to view content. For example, in operation, when a party chooses to view or buy content, a negotiation occurs between Party A and Party B which may result in one or more of a cipher transaction, the recordation of the time, and/or communication of a device ID, user ID, content ID, content license level, and/or other information that enables the providing, exchanging, or transferring the right to view CAC content. In an exemplary embodiment, details of CAC transaction 410 may be reported by both parties A and B, or alternatively only by party A, to centralized blockchain processing system 400 according to the illustrated model, and then add relevant details of transaction 410 to a distributed blockchain ledger (not shown).

In an exemplary operation of system 400, party A chooses to share, sell, or transfer CAC content to party B. A negotiation (i.e., CAC transaction 410) occurs, which can be based upon policies and/or rules, and parties A and B agree to terms. Party A then compiles a body of information into an envelope, which may include a media key, and may encrypt the envelope, body of information, and media key using a private key of party A, similar to the distributed model of system 300. In this example, the envelope may similarly form the basis for establishing CAC transaction 410, and the envelope is submitted (i.e., broadcast 412) to blockchain node 404. Alternatively, both parties A and B may submit envelopes to blockchain node 404.

Upon receipt of details of CAC transaction 410, node 404 is configured to validate the transaction using the public key of party A. Once the transaction is validated, node 404 is configured to transmit an acknowledgment (i.e., acknowledgments 414) to submitting parties A and B, and then relay (i.e., transaction propagation 416) the details of validated transaction 410 to blockchain processor 402. In the alternative embodiment, where both parties A and B submit envelopes to node 404, each such envelope must be separately validated and compared to determine its validity.

Also upon receipt of details of CAC transaction 410, blockchain processor 402 is further configured to add the details of the transaction to a pending block of the associated blockchain. At an appropriate time interval, blockchain processor 402 is also configured to process the pending block and append the relevant transaction information to the prior blockchain while computing and/or estimating the appropriate hash. Similar to system 300, the solution may then be propagated. In an alternative embodiment, the use of time intervals and hash estimations may be further implemented to increase the security of the blockchain. The time of the transaction and its processing thus become significant advantageous security features of the blockchain using the centralized model of FIG. 4.

In an alternative embodiment, for security purposes, blockchain processor 402 is configured to share and elect additional blockchains similar to the distributed architecture of FIG. 3, but still subject to the centralized model as illustrated. In a further alternative, system 400 may be implemented with cryptographic acceptance by party B, and may also be implemented in both symmetric and asymmetric blockchain processing systems and methods.

Figure 5:
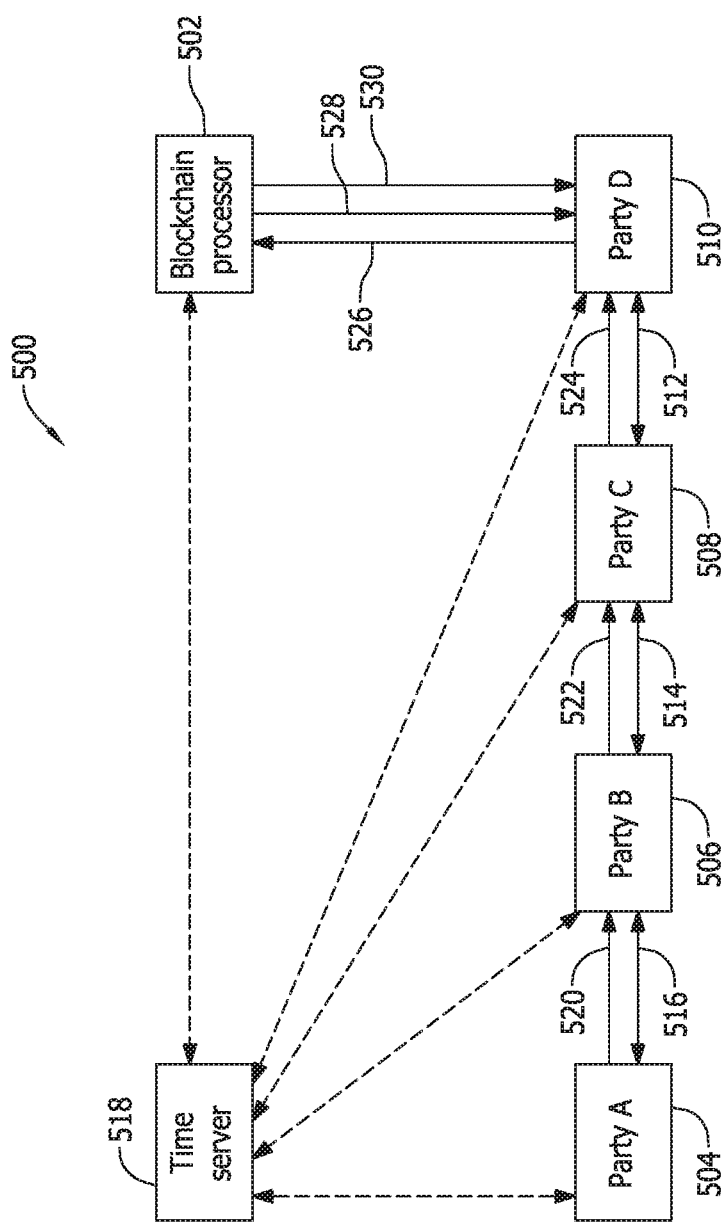
FIG. 5 is a schematic illustration of an exemplary blockchain implementation for the content transaction depicted in FIGS. 1 and 2 according to a linear model.

FIG. 5 is a schematic illustration of an exemplary blockchain system 500 that may be implemented for the CAC transactions depicted in FIGS. 1 and 2, according to a linear model. In an exemplary embodiment, system 500 includes a blockchain processor 402, a first party 504 (party A), a second party 506 (party B), a third party 508 (party C), and a fourth party 510 (party D). System 500 utilizes a linearized model to verify a series of negotiated CAC transactions 512, 514, 516 among the several parties.

For ease of explanation, system 500 is illustrated as a simplified architecture featuring no nodes and a single blockchain processor. In practice, system 500 may include a plurality of redundant nodes and blockchain processors to enhance reliability of the system. Additionally, system 500 is illustrated with 4 parties, however, the series of linear CAC transactions 512, 514, 516 will be understood by a person of ordinary skill in the art to apply to more or fewer parties to implement the linear model structure.

In an exemplary embodiment, system 500 further includes a time server 518, which represents a secure time distribution (dashed lines) over an operable electronic communication network with each of blockchain processor 502, and parties 504, 506, 508, 510. In an exemplary embodiment, the linear model represented by system 500 may consider the time of the respective transactions and their processing as important security features, similar to the centralized model represented by system 400. In an alternative embodiment, time may be relayed in the linear model rather than sent directly to each node (not shown) may be included with system 500. In a further alternative embodiment, where a high degree of trust may exist among the parties and processors in the environment of system 500, time server 518 may be omitted, and each node within system 500 may use its own local time. Where a lower degree of trust exists in the environment of system 500 between the parties, the system architecture, or the cryptography, each respective party can iteratively send details of the relevant one of CAC transactions 512, 514, 516 to one or more nodes, and only the last party involved in the particular transaction need report the transaction to the node (or to blockchain processor 502).

According to the exemplary linear model depicted in FIG. 5, system 500 further includes a plurality of submissions 520, 522, 524, 526 of the respective CAC transactions, containing an envelope, from party A, up the linear chain to party D, and then on to blockchain processor 502 (which may include an intervening node, not shown). System 500 further includes an acknowledgment 528 of the transaction validity from blockchain processor 502 to the last party in the linear chain of transactions (party D in this example) and a transaction acceptance 530 from blockchain processor 502 to party D (the final party in the transaction).

This linear model of system 500 differs from the distributed and centralized models (FIGS. 3 and 4, respectively) in that a single party (i.e., party D) serves as the "final node" in the series of transactions, or alternatively, is the sole party this series of transactions to broadcast a node. The particular party that is selected to be the final node can be predetermined, for example, by being the first licensee of a particular master content from a content owner or service provider, or alternatively, the party can be determined in real time according to time limitations encumbering rights of content transfer, or by a limit on the number of transfers allowed, of which may be transmitted to system 500 by a content owner or service provider as part of the CAC content. This linear model is particularly advantageous in implementations where a single master content be shared, gifted, sold, or otherwise transferred to multiple parties without requiring a separate negotiation between all the parties of the chain and or the service provider.

In the exemplary linear model illustrated in FIG. 5, blockchaining is implemented to advantageously enable, track, and report CAC transactions between multiple parties (i.e., parties A, B, C, D). This implementation thus further allows for the enabling, providing, exchanging, and/or transferring of the right to view or otherwise experience licensed content. For example, in operation, when a party chooses to view or buy content, a negotiated CAC transaction 512 occurs between party D and party C, which may result in one or more of a cipher transaction, the recordation of the time, and/or communication of a device ID, user ID, content ID, content license level, and/or other information that enables the providing, exchanging, or transferring the right to view CAC content. In the example shown, party C then initiates with, or responds to a request from, party B for negotiated CAC transaction 514 regarding the same CAC content, which may be further encumbered after being received by party C. A similar negotiated CAC transaction 516 may occur between party B and party A over the same CAC content, in the event where the linear transfer continues beyond party B. In each respective CAC transaction, the respective parties agree to terms, and the transactions may be based upon policies and/or rules.

In this example, party A will first compile the body of information into an envelope, which may include a media key, and may encrypt the envelope, body of information, and media key using a private key of party A. Similar to the examples discussed above, the envelope may form the transaction basis, and the envelope is then submitted (i.e., submission 520) next party in line, which is party B in this example. This process will then be iterated until the CAC transaction arrives at the final node, which is party D in this example.

Upon receipt of the respective CAC transaction, the respective receiving party is configured to validate the transaction using the public key of party A. Once the transaction is validated, the receiving party may acknowledge the transaction to the submitting party or parties. When reaching the final transaction (i.e., CAC transaction 512) in the linear architecture, the final node party (i.e., party D) is configured to relay (i.e., submission 526) the transaction to blockchain processor 502. If the transaction is not the final transaction linear chain (e.g., CAC transaction 514), the receiving party is configured to append the prior transaction to a new transaction, which may then be submitted to the next party in the linear chain.

In an exemplary embodiment, upon receipt the transaction by blockchain processor 502 (i.e., from submission 526), blockchain processor 502 is configured to verify the validity of the transaction. Once a validated, blockchain processor is configured to acknowledge (i.e., by acknowledgment 528) the validity to the providing party (party D in this example) and add the details of the transaction to a pending block of the associated blockchain. At an appropriate time interval, blockchain processor 502 is further configured to process the pending block and append the relevant transaction information to the prior blockchain while computing and/or estimating the appropriate hash. The solution may then be propagated. In an alternative embodiment, the final party may relay the transaction acknowledgment and acceptance through the linear architecture.

In an alternative embodiment, each party in the linear chain of system 500 may function as a blockchain processor, thereby itself creating a blockchain and propagating the created blockchain according to any of the embodiments described above, in cooperation with this linear model.

Figure 6:
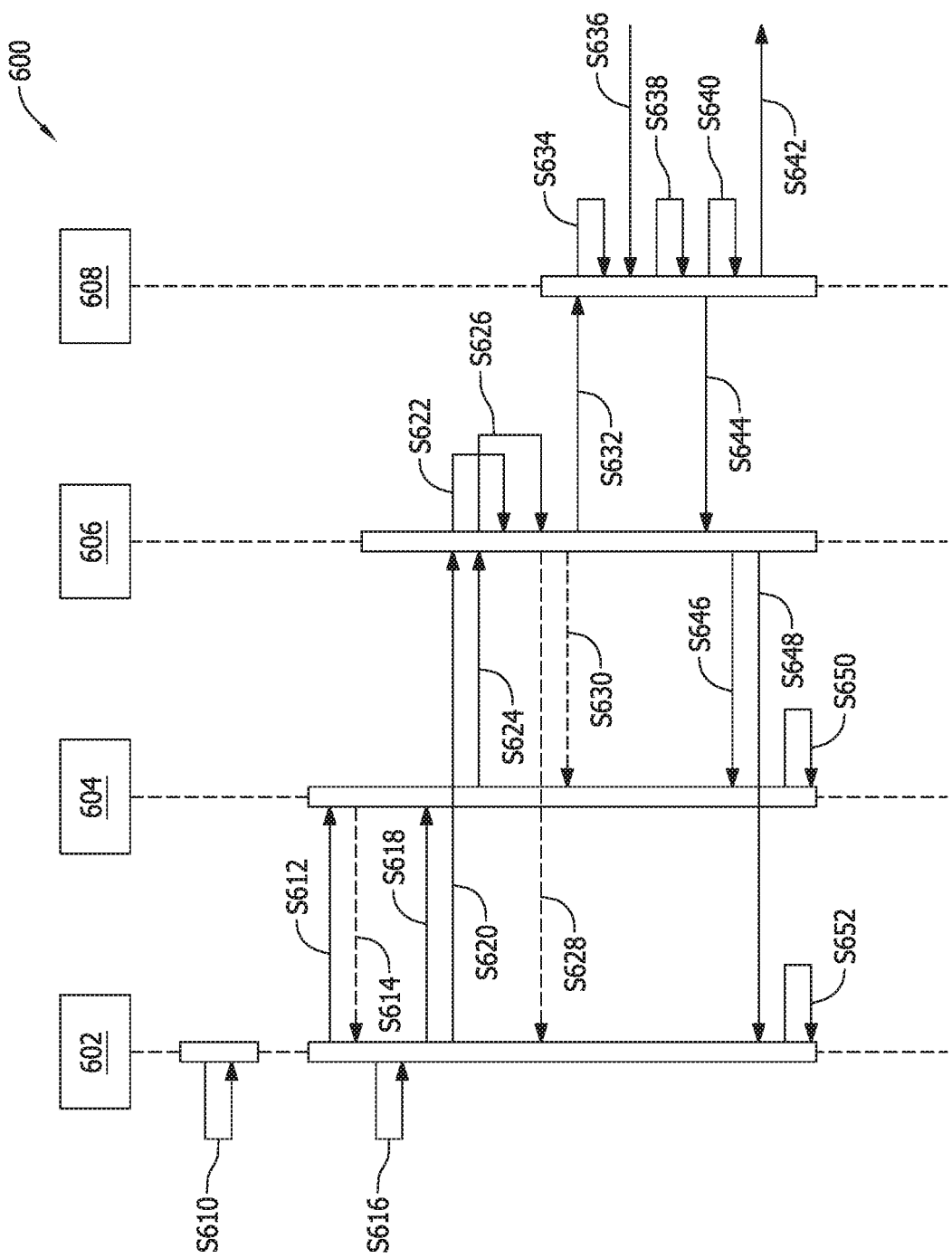
FIG. 6 is a sequence diagram for an exemplary blockchain implementation for a content transaction, according to an embodiment.

FIG. 6 is a sequence diagram for an exemplary blockchain process 600 which may be implemented for a CAC transaction according to the embodiments described herein. In an exemplary embodiment, process 600 includes a content owner 602, a content distributor 604, a blockchain node 606, and a blockchain processor 608. Similar to the embodiments described above, the CAC transaction may include, without limitation, one or more of an envelope ID, content owner data, content owner device data, content distributor data, content distributor device data, time and timestamps, media ID, media URI, license and policy information, and exchange rate information.

When implemented, process 600 may execute the following steps, which are not necessarily required to be in the order listed, except where so clearly designated as being dependent on a prior step. In step S610, content owner will create media metadata to append to a master content (not shown). In step S612, content owner 602 will negotiate terms with content distributor 604. In step S614, content distributor 604 agrees to terms with content owner 602. In step S616, content owner compiles an envelope containing encrypted data and a private key. In step S618, content owner 602 transmits a transaction message to content distributor 604 and also, in step S620, a transaction message blockchain node 606. In step S622, blockchain node 606 validates the transaction with a public key of content owner 602. In step S624, content distributor 604 relays the transaction message to blockchain node 606, and blockchain node 606 validates this transaction as well in step S626. Blockchain node 606 transmits the validation to content owner 602 in step S628, and to content distributor 604 in step S630.

In step S632, blockchain node 606 transmits a message regarding the validated transaction to blockchain processor 608. Blockchain processor 608 then adds the transaction to a pending block in the blockchain in step S634. In step S636, blockchain processor 608 may optionally include blockchain information from other processors. In step S638, blockchain processor 608, at the appropriate time, may determine the appropriate blockchain from among those stored and/or propagated, such as the longest or highest chain, for example. Blockchain processor 608 will append the pending block to the blockchain and compute the next blockchain iteration in step S640. Blockchain 608 may then transmit the block changes to other processors in step S642, and to the blockchain node 606 in step S644. Blockchain node 606 may then relay the blockchain to content distributor 604 in step S646, and to content owner 602 in step S648. Content distributor may verify the blockchain transaction in step S650, and content owner 602 may verify the blockchain transaction in step S652.

Figure 7:
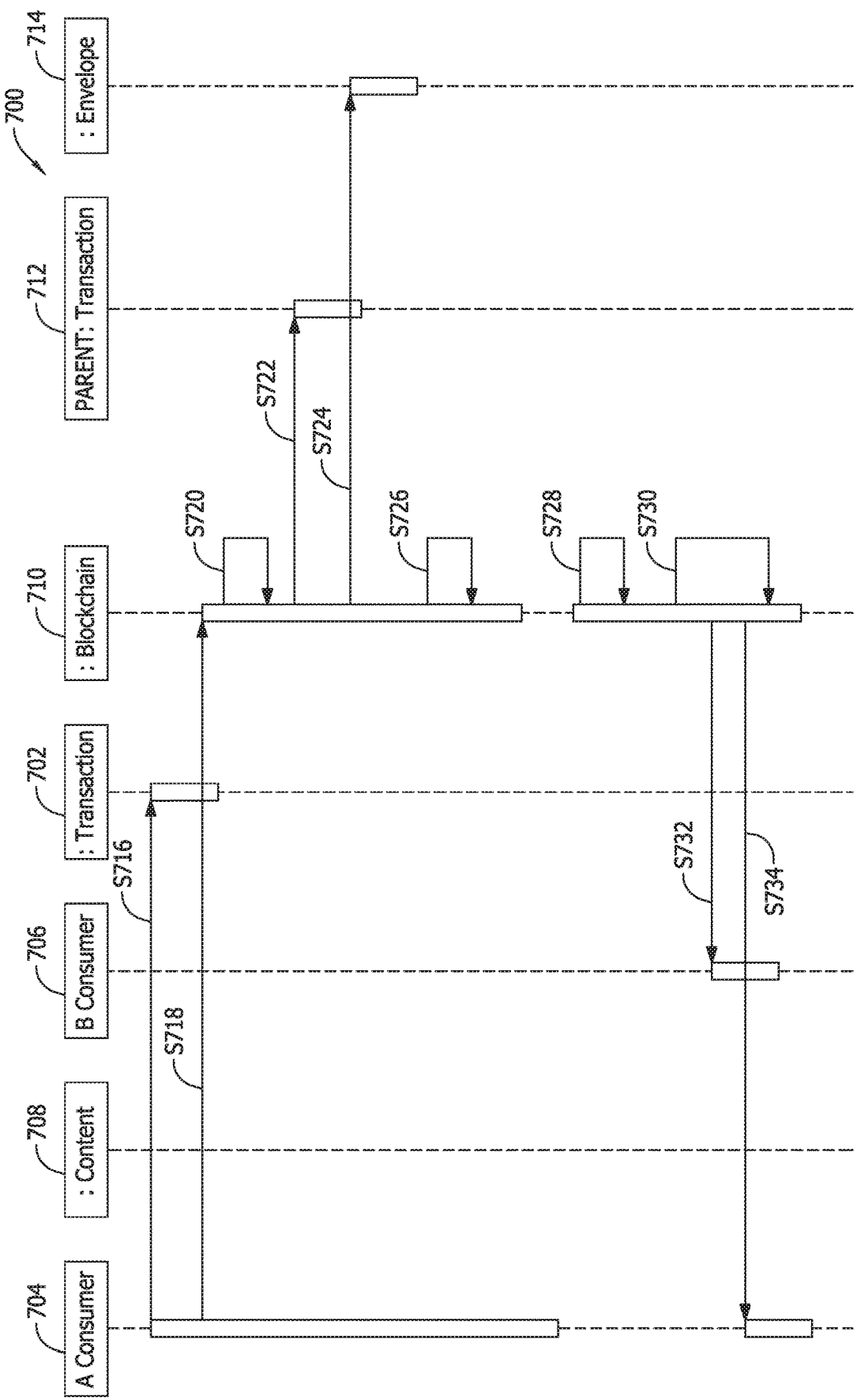
FIG. 7 is a sequence diagram illustrating a consumer sharing content utilizing an exemplary blockchain process, according to an embodiment.

FIG. 7 is a sequence diagram for an exemplary blockchain subprocess 700 which may be implemented for a CAC transaction between two parties/consumers according to the embodiments described herein. In an exemplary embodiment, subprocess 700 illustrates steps relating to a CAC transaction 702, between a first party 704 (party A) and a second party 706 (party B), to share content 708, utilizing a blockchain 710, and with respect to a parent transaction 712 and an envelope 714. In the example illustrated, subprocess 700 assumes that party A has already purchased, rented, or otherwise has rights to content 708 and is entitled to share content 708 with party B.

When implemented, subprocess 700 may execute the following steps, which are not necessarily required to be in the order listed, except where so clearly designated as being dependent on a prior step. In step S716, party A initiates CAC transaction 702, which includes information such as the basis for sharing, the shared content 708, and destinations to which content 708 may be transmitted, downloaded, viewed, or otherwise experienced. In step S718, party A submits information regarding CAC transaction 702 to blockchain 710. Step S720, blockchain 710 searches for the transaction and all prior blocks, and returns once locating parent transaction 712, starting from the most recent block in blockchain 710.

In step S722, blockchain 710 communicates with parent transaction 712 to get envelope 714, and in step S724, blockchain 710 indicates with envelope 714 to get further details regarding the transaction. In step S726, blockchain 710 evaluates a script of envelope 714. In some instances, the evaluated script may warrant collection and evaluation of other parent transactions. A single parent transaction (i.e., parent transaction 712) is illustrated in this example for ease of explanation. In an exemplary embodiment, the evaluation performed in step S726 may further include breadth and depth limits established for sharing content 708 that may be established by one or more of the content creator, owner, and distributor (not shown). Other criteria which may be considered in evaluation step S726 include, without limitation permissions for the particular consumer being allowed to share (party A in this example), among other restrictions. For further ease of explanation, subprocess 700 presumes that party A is successfully allowed to share content 708.

In step S728, blockchain 710 creates a block, which is explained further below with respect to FIG. 10. In step S730, blockchain 710 is configured to generate notifications for observers of subprocess 700, including parties A and B. In an exemplary embodiment, blockchain 710 will also generate notifications for a distributor and/or a content creator or owner in step S730. Blockchain 710 transmits a notification party B in step S732, and to party A in step S734.

Figure 8:
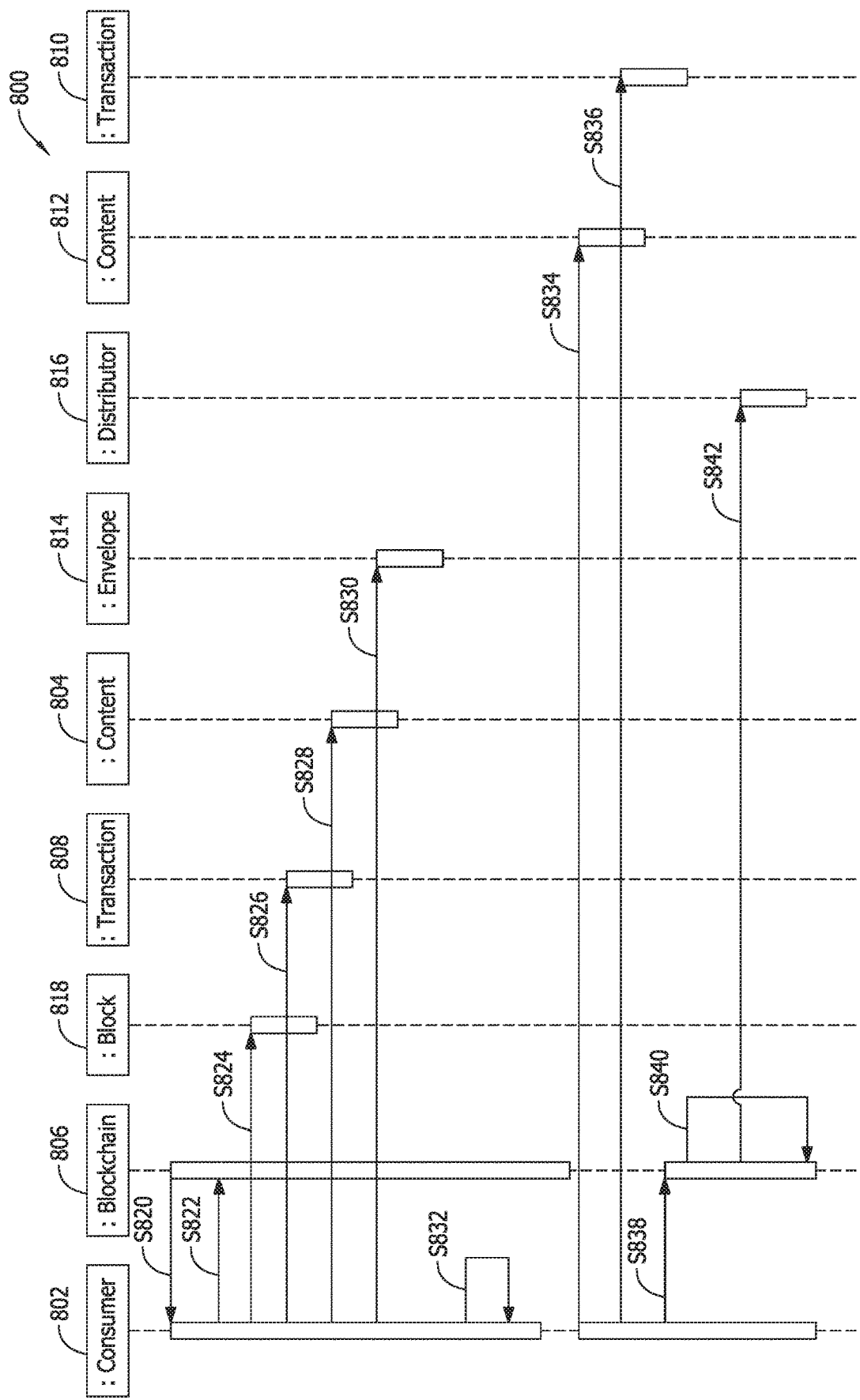
FIG. 8 is a sequence diagram illustrating a consumer purchasing content utilizing an exemplary blockchain process, according to an embodiment.

FIG. 8 is a sequence diagram for an exemplary blockchain subprocess 800 which may be implemented for a CAC transaction involving a consumer purchasing content according to the embodiments described herein. In an exemplary embodiment, subprocess 800 illustrates steps regarding how a consumer 802 may evaluate offered content 804, utilizing a blockchain 806, through a negotiated CAC transaction 808, which progresses into a final transaction 810, for purchased content 812, which may further include an envelope 814, a distributor 816, and at least one block 818 of blockchain 806.

When implemented, subprocess 800 may execute the following steps, which are not necessarily required to be in the order listed, except where so clearly designated as being dependent on a prior step. In step S820, blockchain 806 notifies consumer 802 of an offer for purchase. In this example, subprocess 800 presumes that consumer 802 is already registered to receive notifications from blockchain 806 (or distributor 816). In step S822, consumer 802 communicates with blockchain 806 to get block 818. In step S824, consumer 802 communicates with block 818 to get negotiated CAC transaction 808. In step S826, consumer 802 communicates with negotiated CAC transaction 808 to get offered content 804. In step S828, consumer 802 gets envelope 814 from offered content 804. In step S830, consumer 802 communicates with envelope 814 to get details regarding envelope 814 and the information compiled therein.

In step S832, consumer 802 evaluates envelope 814 to determine if a contract (established, for example, by the content creator) is desirable to purchase rights to view or experience the content. In an exemplary embodiment, the contract by the content creator may be further refined by distributor 816, through allowable changes, which will be reflected in envelope 814, which will include a digital contract. Step S834 presumes consumer 802 has determined contract terms evaluated in step S832 acceptable, and agrees to purchase offered content 804. Accordingly, in step S834, consumer 802 accepts the terms to create purchased content 812. In step S836, consumer 802 initiates final transaction 810 to obtain rights to purchased content 812.

In step S838, consumer 802 submits final transaction 810 to blockchain 806. In step S840, blockchain 806 generates a notification to observers of final transaction 810. In an exemplary embodiment, the generated notification from step S840 is transmitted distributor 816 in step S842 in the case where consumer 802 is agreeing to receive purchased content 812 from distributor 816. Additionally, the generated notification from step S840 may be further sent as an alert to the content creator (not shown), who may have subscribed to events indicating purchase of content from the content creator.

Figure 9:
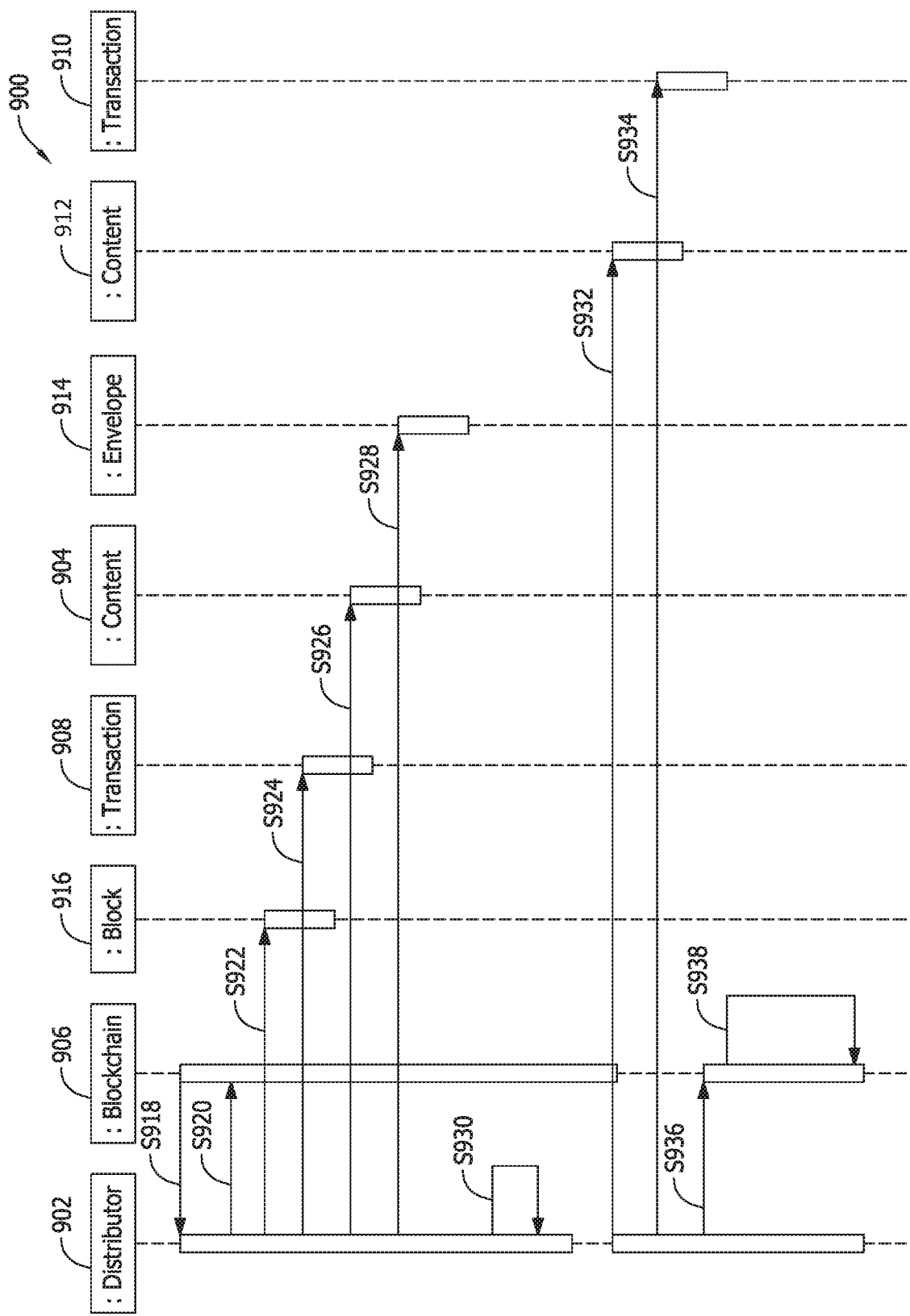
FIG. 9 is a sequence diagram illustrating an interaction with an exemplary blockchain process by a content distributor, according to an embodiment.

FIG. 9 is a sequence diagram illustrating an exemplary subprocess 900 of an interaction by a content distributor with a content creator or owner, utilizing a blockchain according to the embodiments described herein. In an exemplary embodiment, subprocess 900 illustrates steps regarding how a content distributor 902 may evaluate offered content 904 from a content creator/owner (not shown), utilizing a blockchain 906, through a negotiated CAC transaction 908, which progresses into a final transaction 910, for distributed content 912, which may further include an envelope 914, and at least one block 916 of blockchain 906.

When implemented, subprocess 900 may execute the following steps, which are not necessarily required to be in the order listed, except where so clearly designated as being dependent on a prior step. In step S918, blockchain 906 notifies content distributor 902 of an offer from a content creator to distribute content. In this example, subprocess 900 presumes that content distributor 902 is already registered to receive notifications from blockchain 906 (or for the content creator) about blocks posting new content for distribution.

In step S920, content distributor 902 communicates with blockchain 906 to get block 916. In step S922, content distributor 902 communicates with block 916 to get negotiated CAC transaction 908. In step S924, content distributor 902 communicates with negotiated CAC transaction 908 to get offered content 904. In step S926, content distributor 902 gets envelope 914 from offered content 904. In step S928, content distributor 902 communicates with envelope 914 to get contract information from the content creator/owner.

In step S930, content distributor 902 evaluates envelope 914 to determine if a contract (established, for example, by the content creator) is desirable to purchase distribution rights to offered content 904. In an exemplary embodiment, the envelope 914 may include a digital contract. Step S932 presumes content distributor 902 has determined contract terms evaluated in step S930 acceptable, and agrees to distribute offered content 904. Accordingly, in step S932, content distributor 902 accepts the terms to create distributed content 912. In step S934, content distributor 902 initiates final transaction 910 to obtain rights to distributed content 912.

In step S936, content distributor 902 submits final transaction 910 to blockchain 906. In step S938, blockchain 906 generates a notification to observers of final transaction 910, to be sent as an alert to the content creator/owner. In an alternative embodiment, the notification from step S938 may also generate an alert for relevant consumers, which may occur at substantially the same time, or at a later time. In a further alternative embodiment, the creation of block 916 (discussed below with respect to FIG. 10) may occur with the transaction generation in subprocess 900, or at the time envelope 914, which includes the contract, is generated to wrap the transaction.

Figure 10:
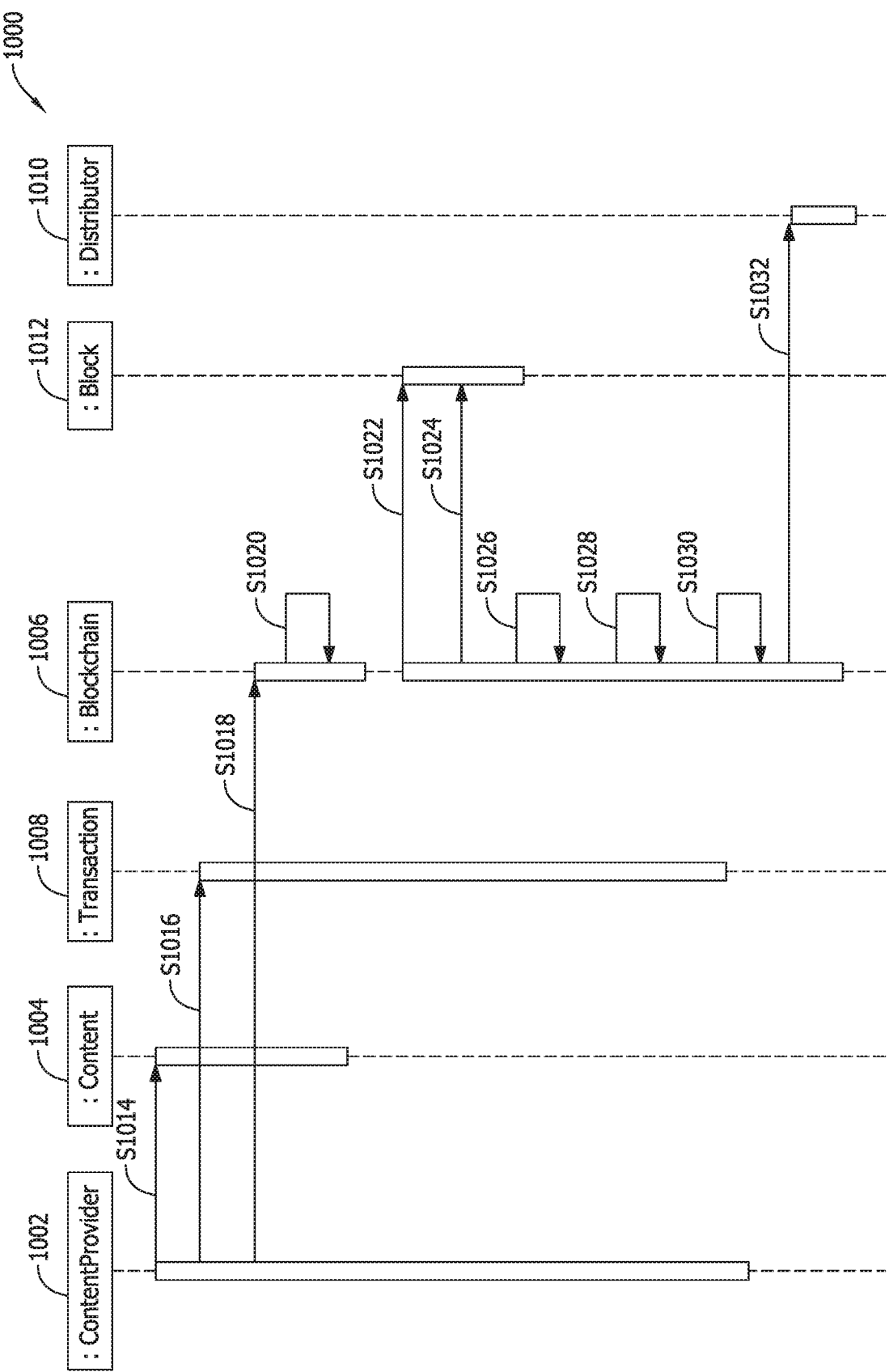
FIG. 10 is a sequence diagram illustrating an interaction with an exemplary blockchain process by a content provider, according to an embodiment.

FIG. 10 is a sequence diagram illustrating an exemplary subprocess 1000 of and interaction by a content provider with a distributor, utilizing a blockchain according to the embodiments described herein. In an exemplary embodiment, subprocess 1000 illustrates steps regarding how a content provider 1002 may implement configurable consensus to provide content 1004, utilizing a blockchain 1006, through a CAC transaction 1008, to a distributor 1010, and generating at least one block 1012 of blockchain 1006.

When implemented, subprocess 1000 may execute the following steps, which are not necessarily required to be in the order listed, except where so clearly designated as being dependent on a prior step. In step S1014, content provider 1002 creates content 1004 to submit for transaction 1008. In step S1016, content provider 1002 creates transaction details to submit to blockchain 1006, and submits transaction 1008 to blockchain 1006 and step S1018. In step S1020, blockchain 1006 notifies observers the presence of the new transaction 1008 which, in an exemplary embodiment, includes alerts to relevant nodes (not shown).

In step S1022, blockchain 1006 creates block 1012 which may include a collection of transaction 1008. In an exemplary embodiment, block 1012 is created after a configurable consensus criteria has been met. For example, such criteria may include, without limitation, a specified time limit after a previous block has been added, a determination that a specified number of minimum transactions are ready to be processed, and/or other mechanisms for triggering block creation. In step S1024, blockchain 1006 is configured to calculate the Merkle Root. In an exemplary embodiment, blockchain 1006 utilizes hashing to perform the Merkle operation on a transaction tree, thereby arriving at a single hash representing the entire transaction graph.

In step S1026, blockchain 1006 notifies that a new block (i.e., block 1012) has been created for the particular node associated with the new block. In step S1028, blockchain 1006 utilizes the configurable consensus mode in order to determine and achieve network agreement as to which block is to be accepted as the next block in blockchain 1006. Such network agreement may be achieved, for example, by utilization of algorithms including, without limitation, a calculation of the most transactions in a block, a voting operation between the nodes, a fiat from a central evaluation source, the maximization of values of weighted attributes of transactions, or by combinations of one or more of these algorithms. In step S1030, blockchain 1006 generates a notification for observers of the achieved agreement, and transmits a notification to distributor 1010 in step S1032.

Hardware/Software Binding for Virtualized Environments, Software-Based Infrastructure A key goal of virtualized environments is to allow specialized software to be implemented on generalized hardware. However, some hardware may not be deployed in locations (physically, logically, or geographically) suitable for secure operation of some software. Moreover, some software should only be run on particular hardware, or in cooperation with additional software packages on particular hardware.

Therefore, in accordance with the embodiments described herein, the present inventors have further developed a cryptographic binding mechanism that ensures particular software can only be run on particular hardware. This cryptographic binding mechanism is of particular advantageous use with respect to the present embodiments with respect to providing further security to receipts using blockchain. Such implementations for blockchain embodiments may further incorporate variations including, without limitation: single level challenges; multi-level (recursive) challenges; and durations of challenge validity.

The present inventors further envision that such cryptographic binding mechanisms are of further utility with respect to encryption as a domain or VM separation mechanism, and also with regard to use of the hardware/software bindings as a seed for encryption scheme, including, but not limited to, the encryption schemes described above.

Frictionless Content

Figure 11:
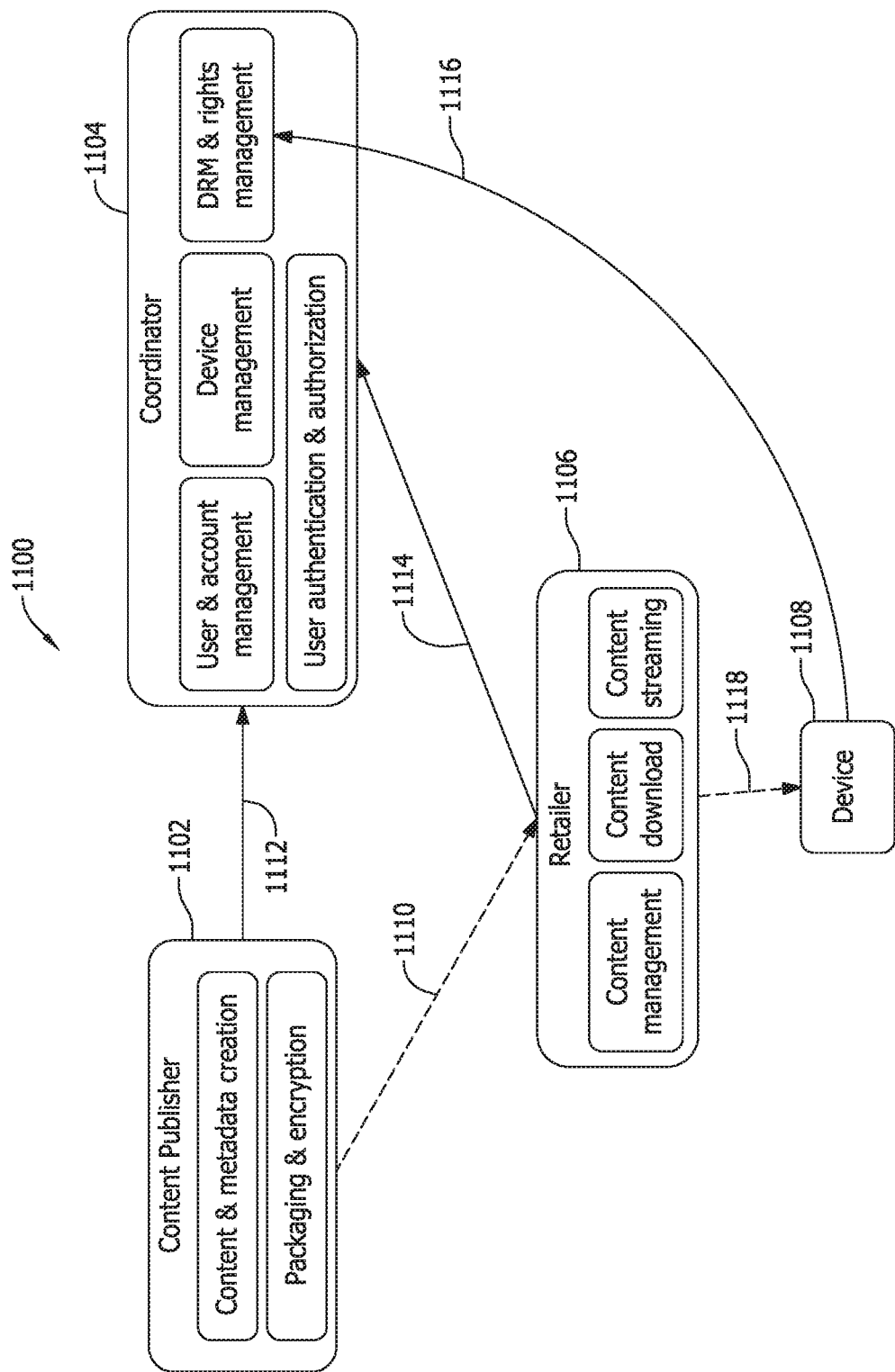
FIG. 11 is a schematic illustration of a conventional blockchain ecosystem.

FIG. 11 is a schematic illustration of a conventional blockchain ecosystem 1100, which may, for example, represent a digital entertainment content ecosystem. Ecosystem 1100 includes a content publisher 1102, a coordinator 1104, a retailer 1106, and at least one electronic device 1108. Content publisher 1102 is responsible for content and metadata creation, and also packaging and encryption of the published content. Coordinator 1104 is responsible for user and account management, device management, digital rights management (DRM), and user authentication and authorization. Retailer 1106 is responsible for content management, as well as content downloads and content streaming to device 1108.

In operation, metadata, content, and keys 1110 are transferred from content publisher 1102 to retailer 1106. Content metadata 1112 is transferred from content publisher 1102 to coordinator 1104. Rights token 1114 is transferred from retailer 1106 to coordinator 1104, device 1108 obtains license acquisition 1116 from coordinator 1104, and fulfillment 1118 occurs between retailer 1106 and device 1108.

Conventional ecosystem 1100 requires a common digital content container and encryption with multiple DRMs, content portability across compliant consumer devices, and a centralized content rights coordinator. One drawback from conventional ecosystem 1100 is that the container and DRM technology predated the eventual technological standards experienced today. Further drawbacks include: unspecified interfaces (represented by dashed lines, with solid lines representing interfaces designated by conventional ecosystem 1100) require unique business-to-business deals between content producers, retailers, and users (e.g., by device 1108); and the centralized coordinator and necessary business-to-business deals still present limits to usefulness of conventional ecosystem 1100.

Figure 12:
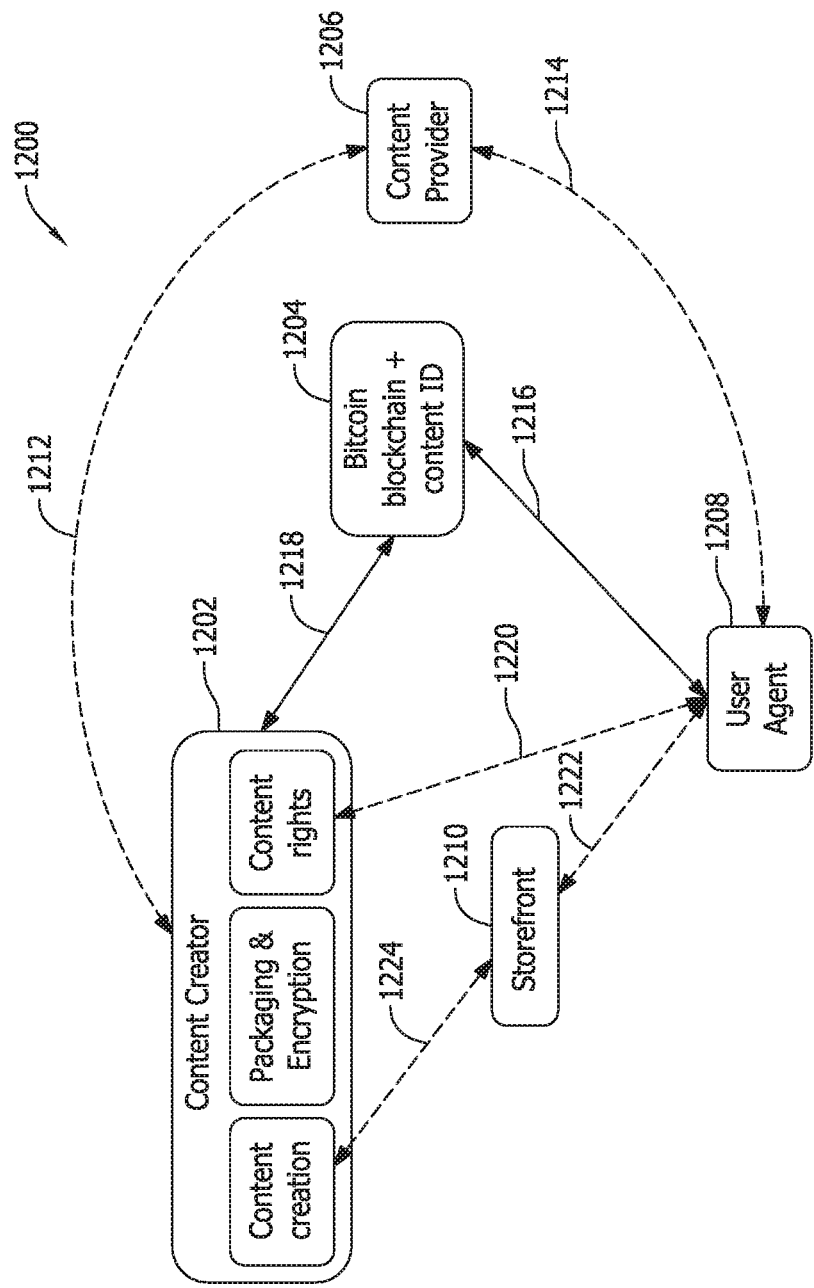
FIG. 12 is a schematic illustration of an exemplary blockchain ecosystem, according to an embodiment.

FIG. 12 is a schematic illustration of an exemplary blockchain ecosystem 1200, according to an embodiment. Ecosystem 1200 includes a content creator 1202, a blockchain 1204, a content provider 1206, a user agent 1208, and a storefront 1210. Ecosystem 1200 represents an implementation of "frictionless content" to address the shortcomings of conventional ecosystem (i.e., ecosystem 1100, FIG. 11). Some advantageous improvements provided by the frictionless content of ecosystem 1200 include, without limitation: DASH, or Dash cryptocurrency, may be substituted for the proprietary media container; implementation of blockchain technology decentralizes the requirement for the conventional coordinator (i.e., coordinator 1104, FIG. 11); and utilization of bitcoin (or an alternative crypto currency) further decentralizes the financial model of the conventional ecosystem.

In operation, content distribution 1212 occurs between content creator 1202 and content provider 1206. Content acquisition 1214 occurs between content provider 1206 and user agent 1208. Content purchase 1216 by user agent 1208 is submitted to blockchain 1204, and blockchain 1204 establishes purchase verification 1218 with content creator 1202. In an exemplary embodiment, user agent 1208 may directly obtain license acquisition 1220 from content creator 1202, and may perform a content browse 1222 from storefront 1210. In the exemplary embodiment, metadata and location information 1224 may be shared between content creator 1202 and storefront 1210. In the example illustrated in FIG. 12, solid lines may represent interfaces governed by blockchain 1204, and dashed lines may represent, for example, a web service or an HTML webpage or web application.

According to the embodiment of FIG. 12, content creator 1202 may be responsible for content creation, packaging and encryption of the content, and also establishment of the rights to use, license, and/or distribute the content. Blockchain 1204 is responsible for cryptocurrency management and content ID. In an exemplary embodiment, ecosystem 1200 utilizes frictionless content to resolve the high barriers to participation experienced according to the conventional ecosystem. For example, present business-to-business requirements typically allow only the largest content creators, distributors, and consumer device vendors to participate. Content is not generally portable across user devices, and usage rights for the content tend to be rigid.

According to the exemplary embodiment depicted in FIG. 12, on the other hand, content distribution may utilize blockchain and DRM technology to remove such participation barriers, and also decentralize financial and rights management such that enable even the smallest content creators may participate within ecosystem 1200 on substantially more equal footing with the significantly larger creators and distributors. Embodiments according to ecosystem 1200 further allow content to be portable across substantially all consumer devices, and the relevant usage rights can be expressed in software enabling dynamic distribution models.

As described in the embodiments above, blockchain technology provides an advantageous payment system and public ledger of content transactions. Such technology further may utilize the use of, without limitation: colored coins, for purchased content metadata on the ledger; DASH, for a universally supported content container; HTML encrypted media extensions and clear key content; and also decryption schemes of universally supported content protection. The frictionless content of ecosystem 1200 is further advantageous to potential new distribution models, including, but not limited to: secondary content markets where content rights can be resold; dynamic aggregation, including an aggregator financial transaction wrapping the content transaction; and "smart content contracts" involving programmatic usage rights that more efficiently may replace paper contracts.

In the exemplary embodiment, implementation of ecosystem 1200 allows for significant simplification of storefront 1210, easier use of packaging and encryption by content creator 1202, a clear key DRM license server, and JavaScript implementation of rights and key management on top of the clear key DRM.

Figure 13:
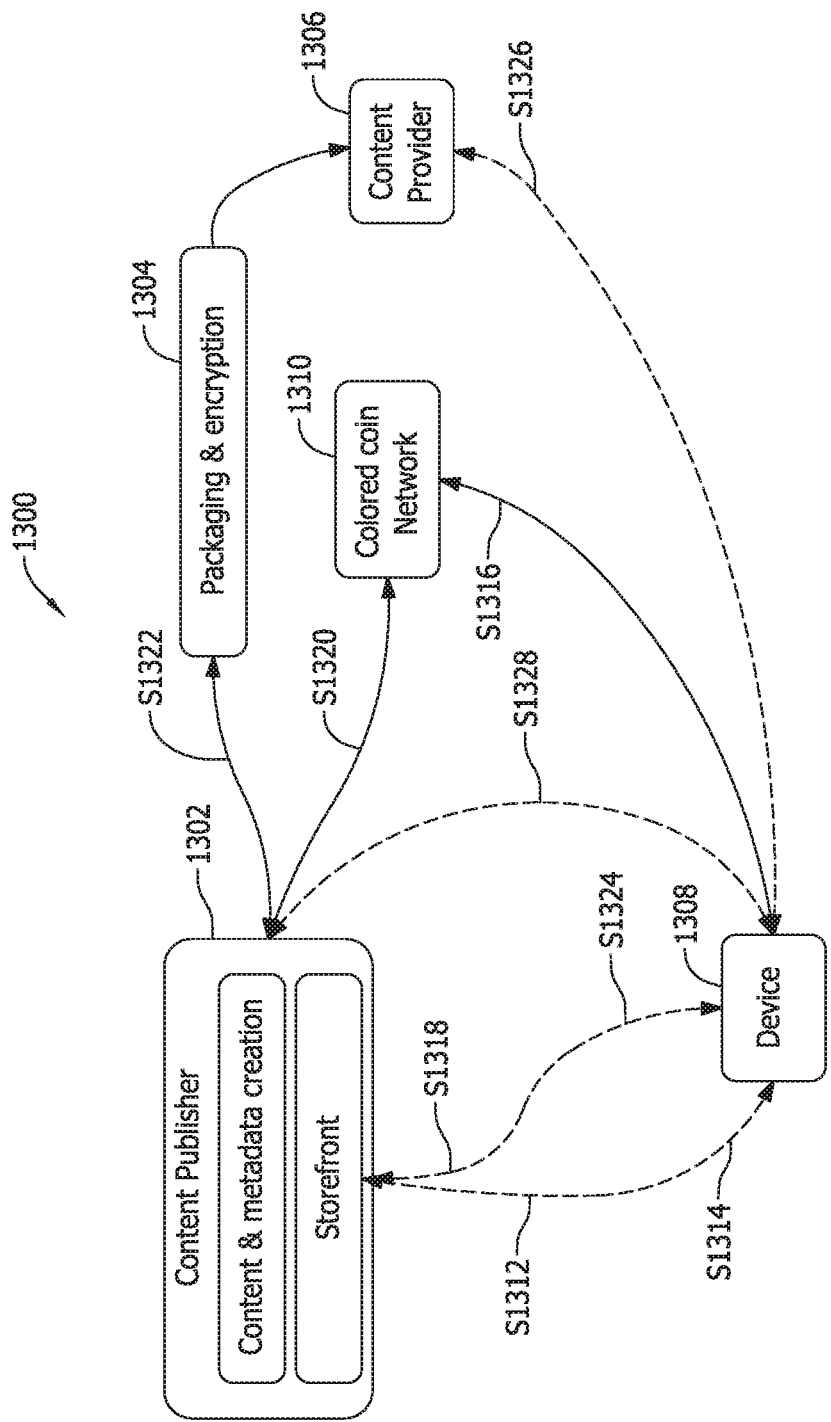
FIG. 13 is a schematic illustration of an exemplary message flow that can be implemented with the ecosystem depicted in FIG. 12.

FIG. 13 is a schematic illustration of an exemplary message flow process 1300 that can be implemented with the ecosystem depicted in FIG. 12. Process 1300 includes a content publisher 1302 responsible for content and metadata creation and storefront management, a packaging and encryption service 1304, a content provider 1306, an electronic device 1308, and utilizes a blockchain 1310, such as a colored coin network.

In operation, process 1300 may execute the following steps, which are not necessarily required to be in the order listed, except where so clearly designated as being dependent on a prior step. In step S1312, electronic device 1308 performs a content search of the storefront of content publisher 1302. In step S1314, content publisher 1302 transmits a blockchain address and/or currency cost to electronic device 1308. In step S1316, presuming a user of electronic device 1308 chooses to purchase content from content publisher 1302 and accepts the transmitted cost, electronic device 1308 initiates a blockchain transaction, which may be a colored coin transaction to blockchain 1310, including the content ID, and payment for the content.

In step S1318, the content ID and other identifications are transferred between content publisher 1302 and electronic device 1308. In step S1320, the transaction is verified between content publisher 1302 and blockchain 1310. In step S1322, the purchased content is pushed from content publisher 1302 to packaging and encryption service 1304. In step S1324, a URL for the content is shared between content publisher 1302 and electronic device 1308. In step S1326, electronic device 1308 gets the content from content provider 1306. In step S1328, a license request and relevant license keys are shared between content publisher 1302 and electronic device 1308. In the exemplary process 1300 depicted in FIG. 13, solid lines represent interfaces governed by blockchain 1310, dashed lines may represent interfaces utilizing a web service, or HTML webpages/web applications (including HTML5), and double lines may represent unspecified interfaces.

Figure 14:
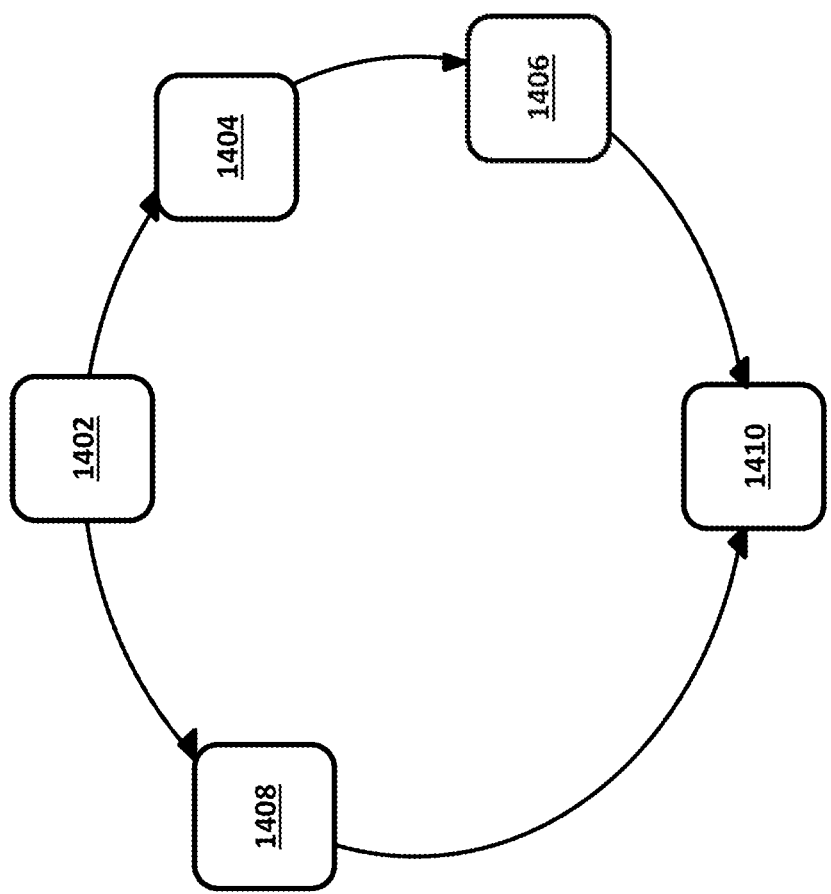
FIG. 14 is a schematic illustration of a conventional vertical blockchain ecosystem.

FIG. 14 is a schematic illustration of a conventional vertical blockchain ecosystem 1400. Ecosystem 1400 includes a content creator 1402, a content packager 1404, a content deliverer 1406, a retailer 1408, and at least one user electronic device 1410. Ecosystem 1400 is similar to ecosystem 1100, depicted in FIG. 11, except that system 1400 provides vertically integrated services. Retailer 1408 is not responsible for content management or delivery to user electronic device 1410. Blockchain technology is implemented within ecosystem 1400 merely to verify payment. That is, a blockchain processor does not include content as currency.

In operation, a purchase transaction is initiated from user electronic device 1410 to retailer 1408, and then metadata, content, rights tokens, and/or keys are transferred from content creator 1402 to user electronic device 1410 through content packager 1404 and content deliverer 1406. In an exemplary embodiment, a software application on user electronic device 1410 interacts with a web application of retailer 1408. Vertically integrated ecosystem 1400 otherwise operates similarly to ecosystem 1100. Ecosystem 1400, however, represents a paid digital media ecosystem having participation barriers similar to those described above with respect to FIG. 11. Smaller content creators and distributors have difficulty selling content directly to end users due to the need to utilize a third party intermediary for content delivery network (CDN) and DRM services.

Performance by the third party intermediary is difficult to verify, and smaller creators/distributors generally have little leverage with which to negotiate terms. Other such third party intermediary barriers include: use of a centralized rights store, where shared rights and portability across multiple devices and/or retailers are limited; unspecified payment terms or fixed payment models; limited fulfillment and device support options; requirements to use particular proprietary technology; difficulty utilizing ecosystem offline; and lack of rights controls or verification on end devices.

More particularly, conventional vertically integrated distribution processes for monetizing digital media require fixed costs that limit participation, pricing, usage rights, and media use. Examples include cable networks, large-scale online media providers, digital media distributors, and online sites for displaying and distributing user-generated content. The content creators have little control over the content distributed through these channels, and the content users face a variety of restrictions in their use of purchased content. Additionally, the costs associated with large distribution channels limit their availability to only content that is considered high-value. Existing smaller distribution channels have lower, but still fixed costs, and the array of media that is distributed through the smaller distribution channels limited. Pricing and usage flexibility is limited for both large and small distribution channels.

Figure 15:
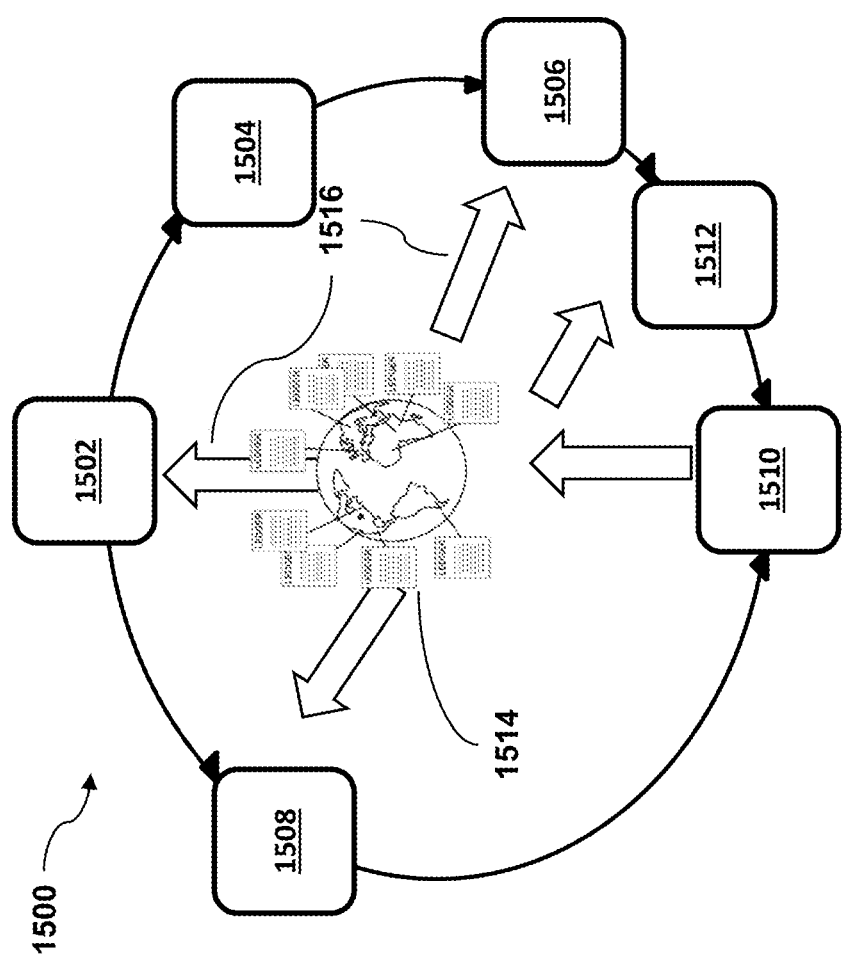
FIG. 15 is a schematic illustration of an exemplary vertical blockchain ecosystem, according to an embodiment.

FIG. 15 is a schematic illustration of an exemplary vertical blockchain ecosystem 1500, according to an embodiment. Similar to ecosystem 1400 (FIG. 14), ecosystem 1500 includes a content creator 1502, a content packager 1504, a content deliverer 1506, a retailer 1508, and at least one user electronic device 1510. Different from ecosystem 1400, ecosystem 1500 further includes a DRM 1512 and a blockchain 1514. In an embodiment, content packager 1504, content deliverer 1506, and DRM 1512 are integrated portions of a single content creator service (not separately numbered). Ecosystem 1500 represents an alternative implementation of frictionless content, or frictionless media, to address the shortcomings of ecosystem 1400. That is, blockchain 1514 functions as a shared database to verify not only financial payments, but also content usage and rights.

Ecosystem 1500 is similar to ecosystem 1200 (FIG. 12) in that ecosystem 1500 is also capable of utilizing DASH cryptocurrency, HTML encrypted media extensions and clear key content, JavaScript, decryption schemes, a decentralized coordinator and financial model, and utilization of bitcoin or alternative cryptocurrencies. For simplicity of explanation, other shared similarities with ecosystem 1200 are not illustrated in FIG. 15.

In operation, blockchain 1514 functions as the "third party" intermediary by providing the shared database to confirm verification 1516 of payment and content distribution to each of the several parties. More particularly, a blockchain transaction utilizing blockchain 1514 includes the rights for a content asset purchased through the transaction, such as a rights expression, and/or an asset ID. A transaction utilizing ecosystem 1500 is initiated when a user (i.e., through user electronic device 1510) chooses to purchase content from retailer 1508, as described further below respect to FIGS. 16 and 17. Similar to ecosystem 1200 (FIG. 12), content creator 1502 and the content creator service (1504, 1506, 1512) may be responsible for content creation, packaging, and encryption, and also establishment of the rights to use, license, and/or distribute the content. Blockchain 1514 is responsible for cryptocurrency management and content ID.

Through use of the advantageous frictionless media ecosystem 1500, essentially any set of parties are able to execute a financial transaction without first having to establish prior trust with an intermediary, or an existing relationship with a trusted third party. As with the embodiments described above, ecosystem 1500 is further capable of realizing implementation of blockchain technology to include digital assets (e.g., content ID, commitment to deliver a service, and associated rights) as part of the blockchain transaction. Additionally, according to this exemplary embodiment, content protection can be based on publicly viewable rights, and the transaction database of blockchain 1514 is distributed, secure, immutable, transparent, and visible to all parties.

A frictionless media ecosystem according to FIG. 15 thereby decentralizes the paid media distribution model by eliminating, or reducing the significance of, a third party intermediary digital media transactions with respect to payment, rights, and verification. Content creators may advantageously utilize ecosystem 1500 to sell content directly to users, and then verify content usage by the users.

Figure 16:
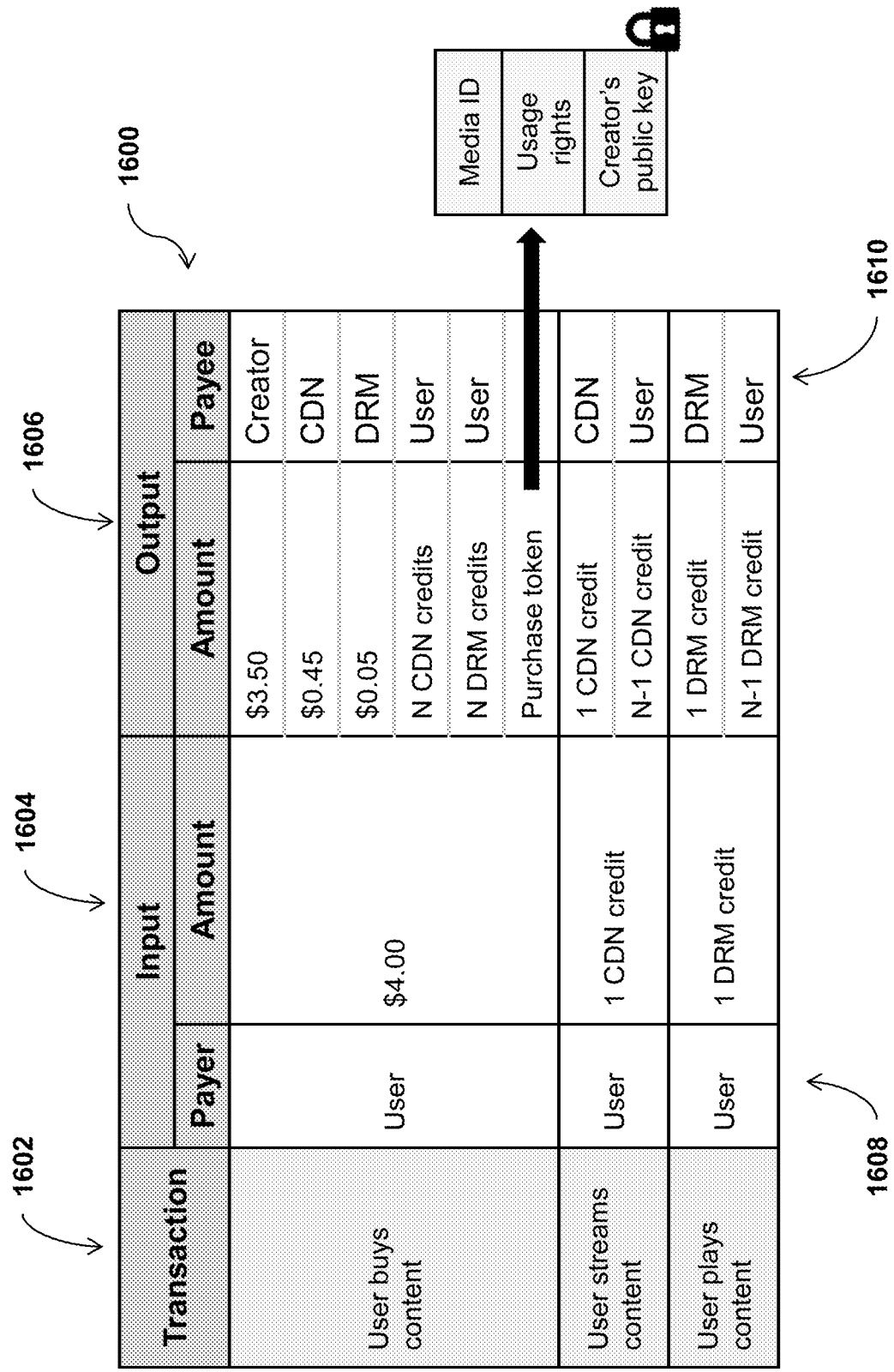
FIG. 16 illustrates a transaction table for exemplary transactions performed utilizing the blockchain of the ecosystem depicted in FIG. 15.

FIG. 16 illustrates a transaction table 1600 for exemplary transactions 1602 performed utilizing blockchain 1514 of ecosystem 1500, as depicted in FIG. 15. In accordance with the embodiments described above, each of transactions 1602 may be a CAC transaction. For each transaction 1602, blockchain 1514 receives payer inputs 1604 from a content user 1608, and transmits payee outputs 1606 to one or more payees 1610. In the example illustrated, a user (e.g., user electronic device 1510, FIG. 15) purchases from a content creator (e.g., content creator 1502, FIG. 15) N number of views/uses/streams of media content for $4.00. In an exemplary embodiment, N is a predefined number set by the content creator (or distributor) to limit the number of times a user, or secondary purchaser of the content from the user, may experience the purchased media content. In one example, in the event that the content creator may desire that a user have effectively "unlimited" usage of the content, N may be set to an arbitrarily large value.

In operation, as illustrated in FIG. 16, when the user purchases content (e.g., purchase transaction 1702, FIG. 17, below), blockchain 1514 receives $4.00 of cryptocurrency as payer input 1604. Blockchain 1514 may then distribute the $4.00 cryptocurrency payment among several payees 1610 according to predefined distribution agreements and has payee outputs 1606. In the example shown, the content creator receives $3.50, the CDN (e.g., CDN 1708, FIG. 17, below) receives $0.45, and the DRM (e.g., DRM 1512, FIG. 15) receives $0.05. According to an exemplary embodiment, utilizing the content as currency model of the present disclosure, blockchain 1514 further distributes to the user, as payee outputs 1606, N number of CDN credits and N number of DRM credits. In an embodiment, blockchain 1514 additionally creates a purchase token as a payee output 1606. The purchase token may, for example, include one or more of a media ID, usage rights, and a public key of the content creator, as described above.

Using a similar process, when a user wishes to stream purchased content (e.g., access transaction 1704, FIG. 17, below), for example, blockchain 1514 receives 1 CDN credit from the user (as payer 1608), and then transmits as payee outputs 1606 1 CDN credit to the CDN and N−1 CDN credits to the user. That is, blockchain 1514 verifies to the CDN that the content has been streamed one time, while verifying to the user that the user has one fewer streams available of the original N purchased. The process is effectively the same when a user wishes to play purchased content (e.g., play transaction 1702, FIG. 17, below) on an electronic device (e.g., user electronic device 1510, FIG. 15). When the purchased content is played, blockchain 1514 receives 1 DRM credit from the user, and then transmits 1 DRM credit to the DRM and N−1 DRM credits to the user.

According to the advantageous systems and methods herein, the media credits (CDN and/or DRM) are themselves used as some of the cryptocurrency of blockchain 1514. The immutable nature of blockchain 1514 therefore provides a decentralized payment system and public ledger of content transactions and rights. Content sellers and buyers, as well as other ecosystem parties, are thus able to more easily monetize media distribution without having to establish prior and/or untrusted business relationships. By establishing a predetermined number N of verifiable content uses, a user may freely use or sell the purchased content, and over a number of devices or technologies, and the content creator may nevertheless easily verify each such use. By defining a finite number of content usages, a content creator may also more easily prevent or limit theft or unauthorized use of its intellectual property.

Figure 17:
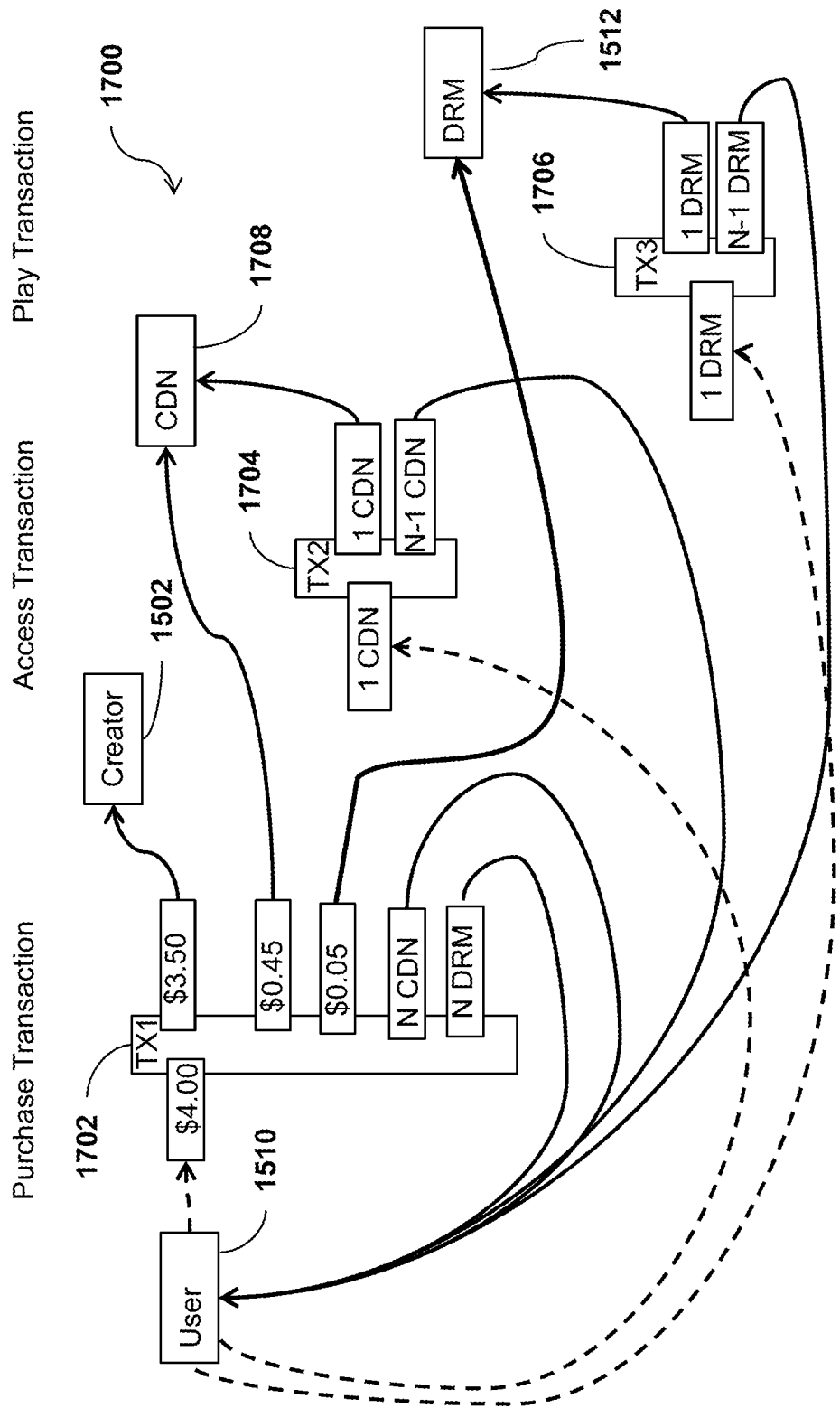
FIG. 17 is a schematic illustration of an exemplary flow process implementing the blockchain ecosystem depicted in FIG. 15 for the transactions depicted in FIG. 16.

FIG. 17 is a schematic illustration of an exemplary flow process 1700 implementing blockchain ecosystem 1500, depicted in FIG. 15, for transactions 1602, depicted in FIG. 16. In an exemplary embodiment, flow process 1700 includes one or more of a purchase transaction 1702, an access transaction 1704, and a play transaction 1706, each utilizing blockchain 1514 for verification. In the example illustrated in FIG. 17, dashed flow lines represent payer inputs 1604 (FIG. 16) and solid flow lines represent payee outputs 1606.

In an exemplary embodiment, purchase transaction 1702 is created by user electronic device 1510 (e.g., through a software application) to purchase content from content creator 1502. Once purchase transaction and 1002 is initiated, a license server (not shown) of DRM 1512 verifies that user electronic device 1510 initiated purchase transaction 1702. Content creator 1502 then creates a purchaseToken, which may include one or more of an asset ID, content rights, a public key of user electronic device 1510, a user authentication token, a signature of content creator 1502, and a public key of content creator 1502. Content creator 1502 then signs the purchaseToken with a private key. In an exemplary embodiment, the purchaseToken is verified as payee output 1606 by blockchain 1514 (e.g., OP_RETURN output in a payment system transaction, such as bitcoin).

After the purchase transaction is completed, a user of user electronic device 1510 may use the purchased content by implementing access transaction 1704 and/or play transaction 1706. In an exemplary embodiment, to initiate either transaction 1704, 1706, the user transmits a license request including a useToken (not shown). In an exemplary embodiment, useToken is created by user electronic device 1510, and may include one or more of a transaction ID, the purchaseToken, a user authentication token, and a user signature. In an embodiment, the useToken may be signed with a private key of the blockchain transaction 1704 and/or 1706. Once received, DRM 1512 verifies the useToken signature with the public key, contained in the purchaseToken, of content creator 1502 according to the respective transaction referenced. These purchase and use tokens are embedded by blockchain 1514 in the respective transaction, and thus codify the link between the respective transaction and each use of the purchased content.

According to this advantageous frictionless media blockchain ecosystem, the enhanced flexibility of use and verification of purchased content renders the ecosystem additionally applicable useful to secondary markets, for example, where users of purchased content may legitimately sell/transfer media rights to one another. The embodiments disclosed herein allow the content creator to easily track and verify the usage of its distributed content, as well as the payments resulting therefrom, without requiring a third party intermediary. The ease and flexibility of the systems and methods disclosed herein allow the parties in the ecosystem to operate more independently of one another, and encourage competition among content distributors of various sizes.

The present systems and methods further allow more reliable portability of content without sacrificing ease of verification. According to the advantageous frictionless media ecosystem, a common encryption scheme may be implemented for multiple DRMs, online retailers may utilize a significantly simplified storefront for content purchase playback applications, and a single blockchain purchase transaction can be easily executed with multiple payees. By utilizing a shared database of the blockchain, the content creators, users, and delivery/license servers may all easily access transaction information, whereas only the users need to create the transactions.

Figure 18:
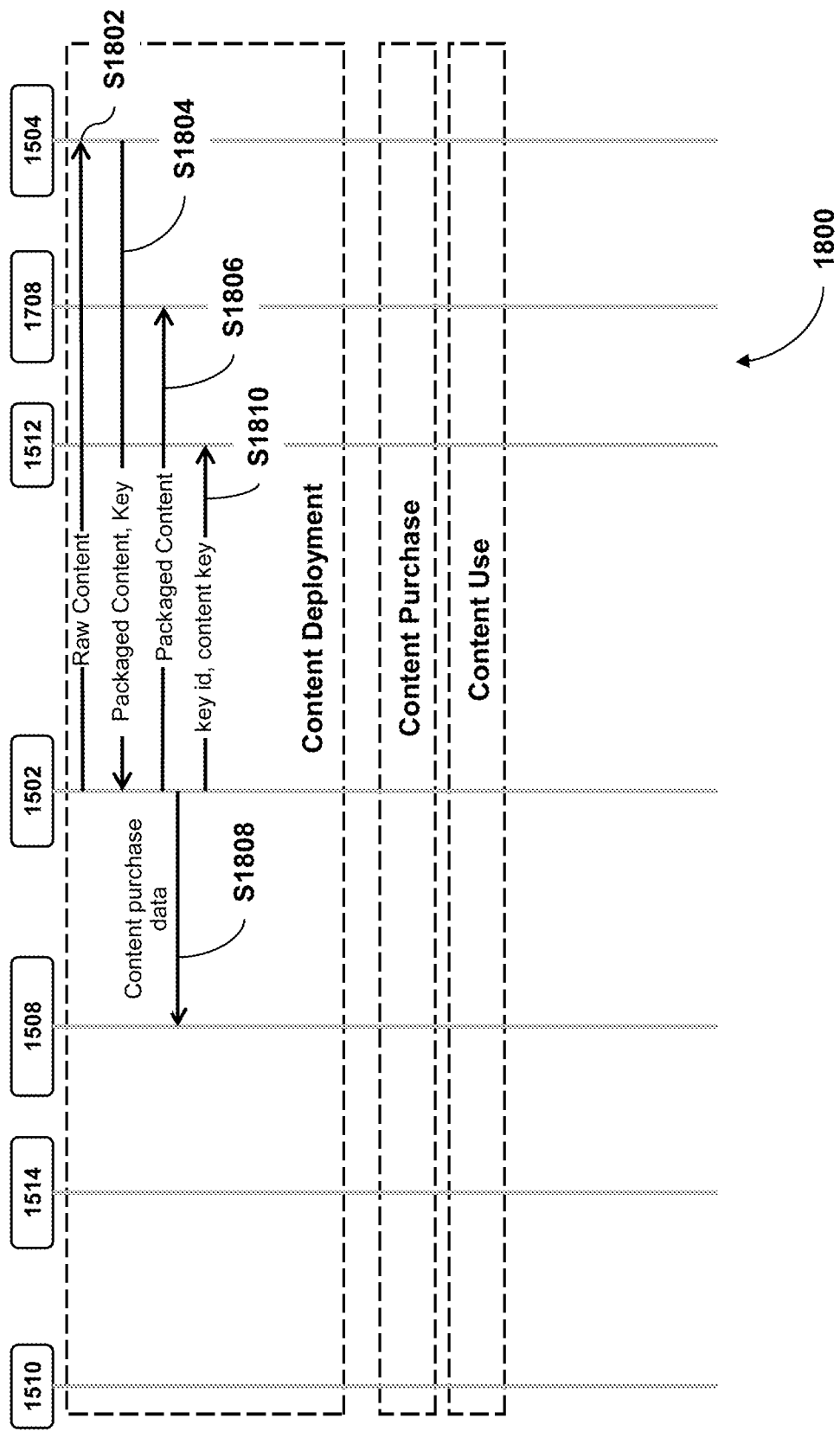
FIG. 18 is a sequence diagram illustrating an exemplary media content deployment that can be implemented with the ecosystem depicted in FIG. 15.

FIG. 18 is a sequence diagram illustrating an exemplary media content deployment process 1800 that can be implemented with ecosystem 1500, depicted in FIG. 15. In an exemplary embodiment, process 1800 is implemented with respect to user electronic device 1510, payment system/blockchain 1514, storefront/retailer 1508, content creator 1502, DRM 1512, CDN 1708, and content packager 1504. For simplicity of explanation, payment system and blockchain 1514 referred to collectively, together. In actuality, the person of ordinary skill in the art will understand that the payment system is the cryptocurrency (e.g., like bitcoin), whereas the blockchain is the technology on which the cryptocurrency is used.

Process 1800 may begin, for example, at step S1802. In step S1802, content packager 1504 receives raw content from content creator 1502. In step S1804, content creator 1502 receives package content, along with at least one key, from content packager 1504. In step S1806, CDN 1708 receives the packaged content from content creator 1502. In step S1808, retailer 1508 receives content purchase data from content creator 1502. In an exemplary embodiment, the content purchase data includes one or more of a URL for CDN 1708, a URL for DRM 1512, a blockchain address for the seller, a purchase price for the packaged content, and the purchase token. As described above, the purchase token may include one or more of an asset ID, content rights, and a public key of content creator 1502, and may also be signed by content creator 1502. In step S1810, DRM 1512 receives the key ID and the content key from content creator 1502.

Figure 19:
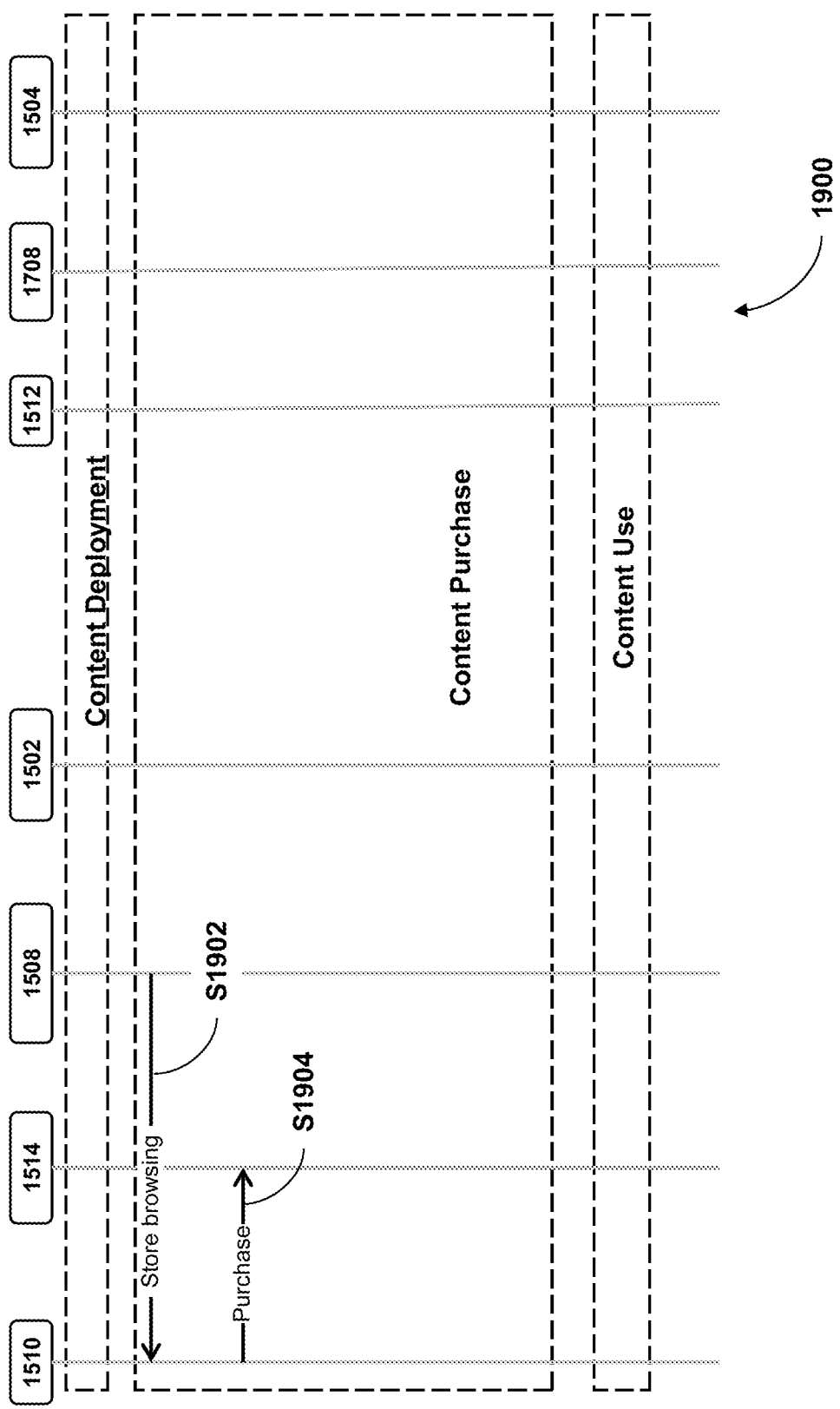
FIG. 19 is a sequence diagram illustrating an exemplary media content purchase that can be implemented with the ecosystem depicted in FIG. 15.

FIG. 19 is a sequence diagram illustrating an exemplary media content purchase process 1900 that can be implemented with ecosystem 1500, depicted in FIG. 15. In an exemplary embodiment, process 1900 is also implemented with respect to user electronic device 1510, blockchain 1514, retailer 1508, content creator 1502, DRM 1512, CDN 1708, and content packager 1504.

Process 1900 may begin, for example, at step S1902. In step S1902, user electronic device 1510 browses content from the storefront retailer 1508. In step S1904, user electronic device 1510 initiates and creates a purchase transaction (e.g., purchase transaction 1702, FIG. 17) with the payment system of blockchain 1514. As described above, and depicted in FIGS. 16 and 17, the user provides payment to blockchain 1514, which is then distributed, according to predetermined agreement, to content creator 1502, CDN 1708, and DRM 1512.

In an exemplary embodiment, the blockchain transaction (purchase transaction 1702 in this example) contains the purchase token (e.g., purchaseToken). According to this example, the user receives one or more colored coins in their user wallet (e.g., payer 1608, FIG. 16) which may then be further used for CDN and DRM credits. By using colored coins in the user's payer wallet of blockchain 1514, the use of CDN and DRM become stateless. That is, a purchase (by the user) is required for each CDN or DRM request. In an alternative embodiment, the respective number of CDN and DRM credits may be encoded directly in the content purchase transaction 1702, and CDN 1708 and DRM 1512 and thereby better able to audit and keep track of how many uses have occurred of the purchased content which may engender payment.

Figure 20:
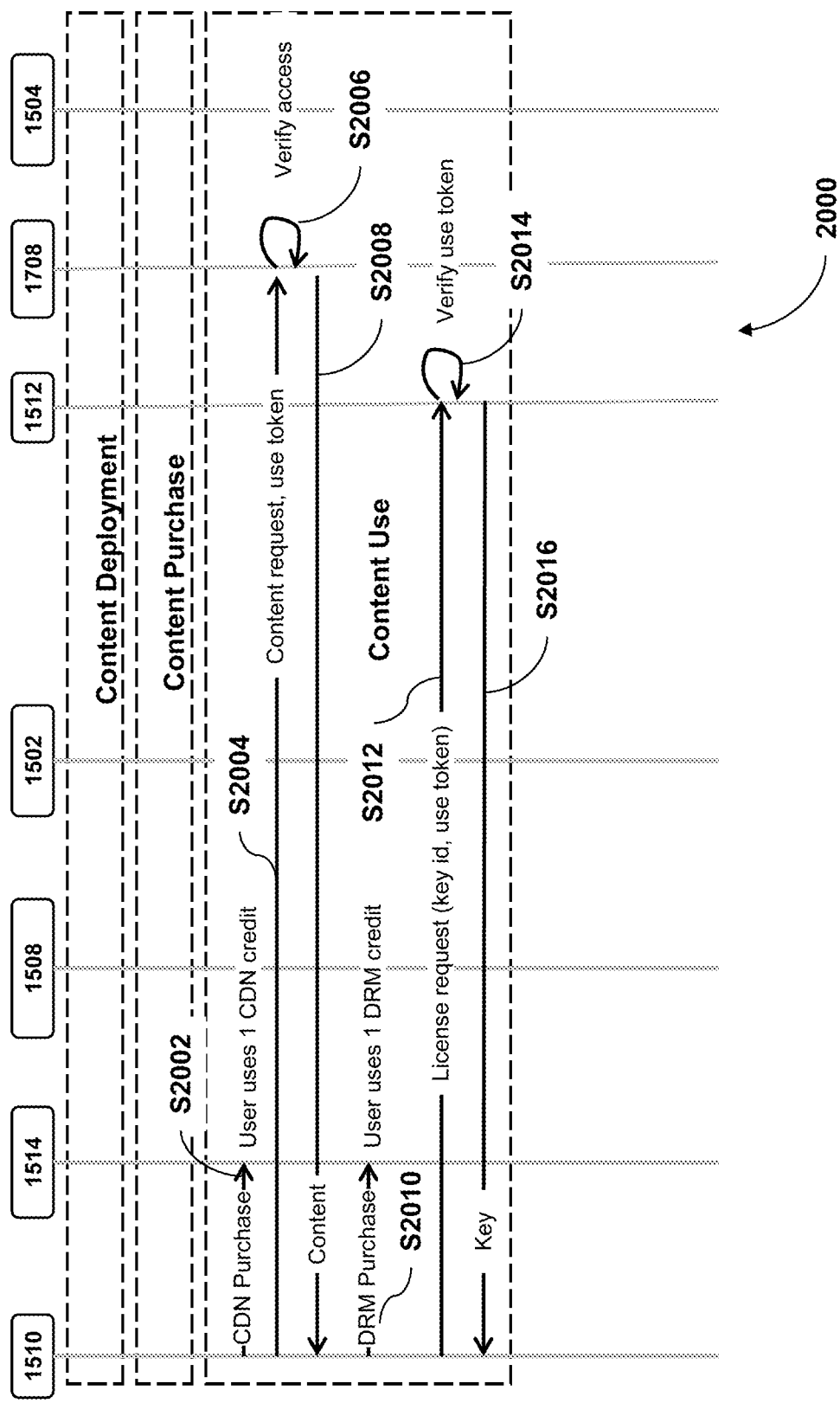
FIG. 20 is a sequence diagram illustrating an exemplary media content usage that can be implemented with the ecosystem depicted in FIG. 15.

FIG. 20 is a sequence diagram illustrating an exemplary media content usage process 2000 that can be implemented with ecosystem hundred, depicted in FIG. 15. In an exemplary embodiment, process 2000 is also implemented with respect to user electronic device 1510, blockchain 1514, retailer 1508, content creator 1502, DRM 1512, CDN 1708, and content packager 1504.

For online streaming usage of purchased content, process 2000 may begin, for example, at step S2002. In step S2002, user electronic device 1510 initiates an access transaction (e.g., access transaction 1704, FIG. 17) with the payment system of blockchain 1514. As described above, and depicted in FIGS. 16 and 17, the user provides 1 CDN credit to blockchain 1514 as payer input 1604. In step S2004, CDN 1708 receives a content request and the use token (e.g., the useToken) from the user electronic device 1510. In an exemplary embodiment, the use token includes an asset transaction ID, a CDN transaction ID, and the purchase token signed with a private key of the transaction used to purchase asset/content. In step S2006, CDN 1708 verifies the use token by one or more of: (1) validating of the token signature with a transaction ID and/or the public key; (2) validating the purchase token signature with the public key of content creator 1502 contained in the purchase token; and (3) verifying the CDN transaction. In step S2008, streaming content is viewable by user electronic device 1510 from CDN 1708.

For device playback usage of purchased content, process 2000 may alternatively begin, for example, at step S2010. In step S2010, user electronic device 1510 initiates a play transaction (e.g., play transaction 1706, FIG. 17) with the payment system of blockchain 1514. As described above, and depicted in FIGS. 16 and 17, the user provides 1 DRM credit to blockchain 1514 as payer input 1604. In step S2012, DRM 12 receives a license request, which may include the key ID and the use token, from the user electronic device 1510. In an exemplary embodiment, the use token includes an asset transaction ID, a DRM transaction ID, and the purchase token signed with a private key of the transaction used to purchase asset/content. In step S2014, DRM 1512 verifies the use token by one or more of: (1) validating use of the token signature with a transaction ID and/or the public key; (2) validating the purchase token signature with the public key of content creator 1502 contained in the purchase token; and (3) verifying the DRM transaction. In step S2016, streaming content is viewable by user electronic device 1510 upon receipt of a key from DRM 1512.

The embodiments described herein significantly improve the security of transactions involving licensed or otherwise encumbered content over electronic networks utilizing blockchain technology. These embodiments facilitate individual customers, users, and subscribers to be active participants in the blockchain network, and not merely just end points of the blockchain. The systems and methods described herein further provide greater ease-of-use at the consumer level, while also allowing content creators/owners and service providers enhanced ability to monitor and audit transactions involving CAC content to which the owners and service providers enjoy continuing rights.

The embodiments disclosed herein further significantly improve the availability and verifiability of CAC transactions using blockchain technology utilizing a frictionless media ecosystem. The frictionless media ecosystem eliminates or substantially reduces all of the fixed costs presently required distribution from the content creator to the user by replacing it with the system that distribute costs for each content distribution instance. The embodiments disclosed herein enable the content creator (of any size) to more easily set its own pricing and media use rights while also providing for the protection media use and content rights across all platforms.

The frictionless media ecosystems illustrated and described herein efficiently leverage cryptocurrency for financial transactions and blockchain technology in order to provide trusted, verifiable accounting, but without requiring a third party intermediary. The systems and methods described herein thereby allow for significantly greater independence among the parties (e.g., content creators, users, deliverers, DRM, etc.), while still providing for easy verification, visibility, and transparency for all parties. The present embodiments further allow for a universal system that can be utilized by any number of existing, or future, technologies that can access the blockchain. Conventional systems (such as HTML5, DASH, Silverlight, Flash etc.), however, are typically limited to the technical environment in which they were created, and may not be utilized with ecosystem platforms. The present embodiments overcome such limitations.

Digital Asset Security Ecosystem

In an exemplary embodiment, cryptographic processes are integrated into camera or other digital asset creation hardware or software. Such cryptographic implementation may utilize certifications for the device, and/or for the user of the device, that assert strong device and/or personal identity, respectively. According to the systems and methods described herein, associated metadata may be registered using a secure transactional database or distributed ledger such as a blockchain. Subsequent transmission, or other dissemination, through networks may then be reliably traced as transactions, which themselves will register if and when a picture or digital asset has been moved or copied. In some embodiments, license rights are encoded into the metadata included in the transaction, in order to better enable the owner of the content to assert ownership rights. In coordination with the several embodiments described above, transactions may then be further chained or spawned as digital assets are modified, in order to show provenance and/or to assert further ownership rights.

Billions of images and minutes of audio/audiovisual recordings are produced daily. This content is produced by and/or for professional, amateur, business, and security concerns, and the potential value of this massive content is significant. However, to a great extent, it is difficult to secure rights to such content, and even more difficult to demonstrate ownership chain (where, when, and by whom the content is created and transferred) and then enforce ownership rights over the content. That is, digital content is easily created and copied, and content distribution ecosystems in particular have been subject to theft and arbitrage, which undermine the benefits of producing and sharing digital content.

The systems and methods described herein resolve these problems by integrating cryptographic processes to digital asset creation and processing systems (e.g., cameras, audio/audiovisual recorders, content creation and editing software, content processors, etc.) to provide more secure content distribution and stronger provenance to the digital content. The implementations described herein are particularly useful for image and/or audio content, and in an exemplary embodiment, utilize a secure registry, such as a distributed ledger technology (e.g., blockchain). These advantageous implementations allow for the creation of new forms of integrated content distribution ecosystems, referred to herein as Digital Asset Security ecosystems (DASe). A subset of DASe includes Digital Image Security ecosystems (DISe).

Figure 21:
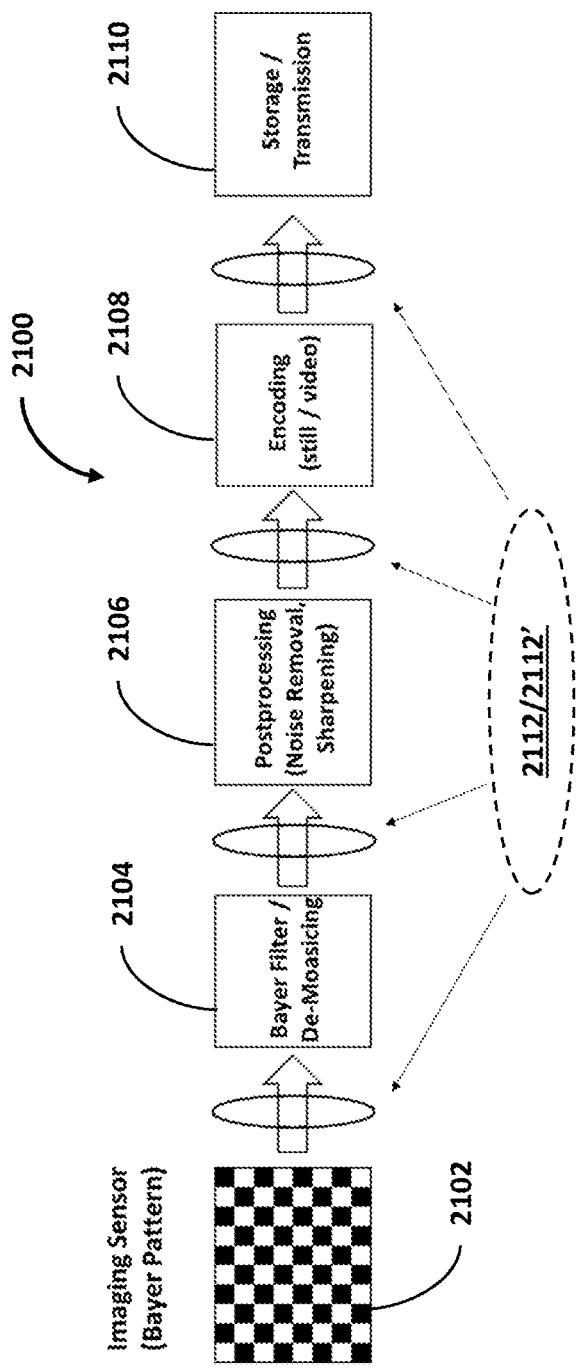
FIG. 21 is a schematic illustration of secure digital asset production, processing, and storage system.

FIG. 21 is a schematic illustration of secure digital asset production, processing, and storage system 2100. In the exemplary embodiment depicted in FIG. 21, for ease of discussion, system 2100 is implemented where the digital asset is a captured image. Alternatively, system 2100 is implemented with respect to a digital asset that is an audio capture, an audiovisual capture, or any digital asset containing proprietary digital content that can be captured, recorded, or created by an electronic device. In this example, the asset is depicted as a digital image because the creation of digital image assets can be highly proprietary, and because modern imaging devices are known to include highly integrated electronic hardware and software systems.

A digital camera, for example, typically includes the following components (not shown): a lens; a sensor assembly; an Application Specific Integrated Circuit (ASIC) or System on Chip (SoC) that processes and encodes captured images; a storage unit or memory; and a transmission unit. In some embodiments, the storage and transmission units are disposed on the same chip that includes the processing and encoding functions. More specifically, in an exemplary embodiment, system 2100 includes five stages: (1) and image (asset) capture device 2102, which is shown as a Bayer pattern type sensor in this example; (2) a pre-processor 2104, such as a filter to convert Bayer patterns into RGB, YUV or other color space data; (3) a post-processor 2106, for adjustment functions including, without limitation, noise removal, sharpening, brightness level, contrast, color temperature; (4) an encoder 2108, for encoding and/or compression regarding still and video data formats; and (5) a memory 2110, for local storage and/or transmission to a remote system (not shown).

In some embodiments, system 2100 additionally includes and analog to digital converter (ADC), and processes instead of, or in addition to image/video data, digital audio data, metadata, and composite data such as a combination of a moving image, audio, and/or metadata. System 2100 further includes a plurality of transition points 2112 between the higher-level functional components 2102 through 2110. In conventional systems, transition points 2112 have been known to present security vulnerabilities. Systems and methods according to the present embodiments, on the other hand, resolve such vulnerabilities by utilizing transition points 2112 as access points 2112' in which to a assert digital signature(s), that is, authentication, to the captured asset. In an exemplary embodiment, secure image authentication is provided in the relatively earlier stages (e.g., during image capture by device 2102, or prior to processing by pre-processor 2104 or post-processor 2106) of the data flow within system 2100.

In an alternative embodiment, system 2100 provides multiple signatures/authentications for the captured asset at one or more of a plurality of stages within system 2100. For example, authentication could be performed on digital data, including without limitation: the raw sensor readout (e.g., at device 2102); for a "lightly" processed format (e.g., at pre-processor 2104); for a processed bit-mapped format, such as sharpening, noise removal etc. (e.g., at the postprocessor 2106); in the encoded format (e.g., at encoder 2108); and/or for storage and/or transmission (e.g., at memory 2110). As explained further below, system 2100 may be further integrated with, devices or ecosystems utilizing encryption, cryptographic ecosystem benefits such as public key infrastructure (PKI) or Global System for Mobile Communications (GSM)/GSM Association (GSMA) secrets management or the equivalent, composite data signing processes (metadata with the digital asset), and/or secure registration (to assert ownership and/or trace provenance).

Figure 22:
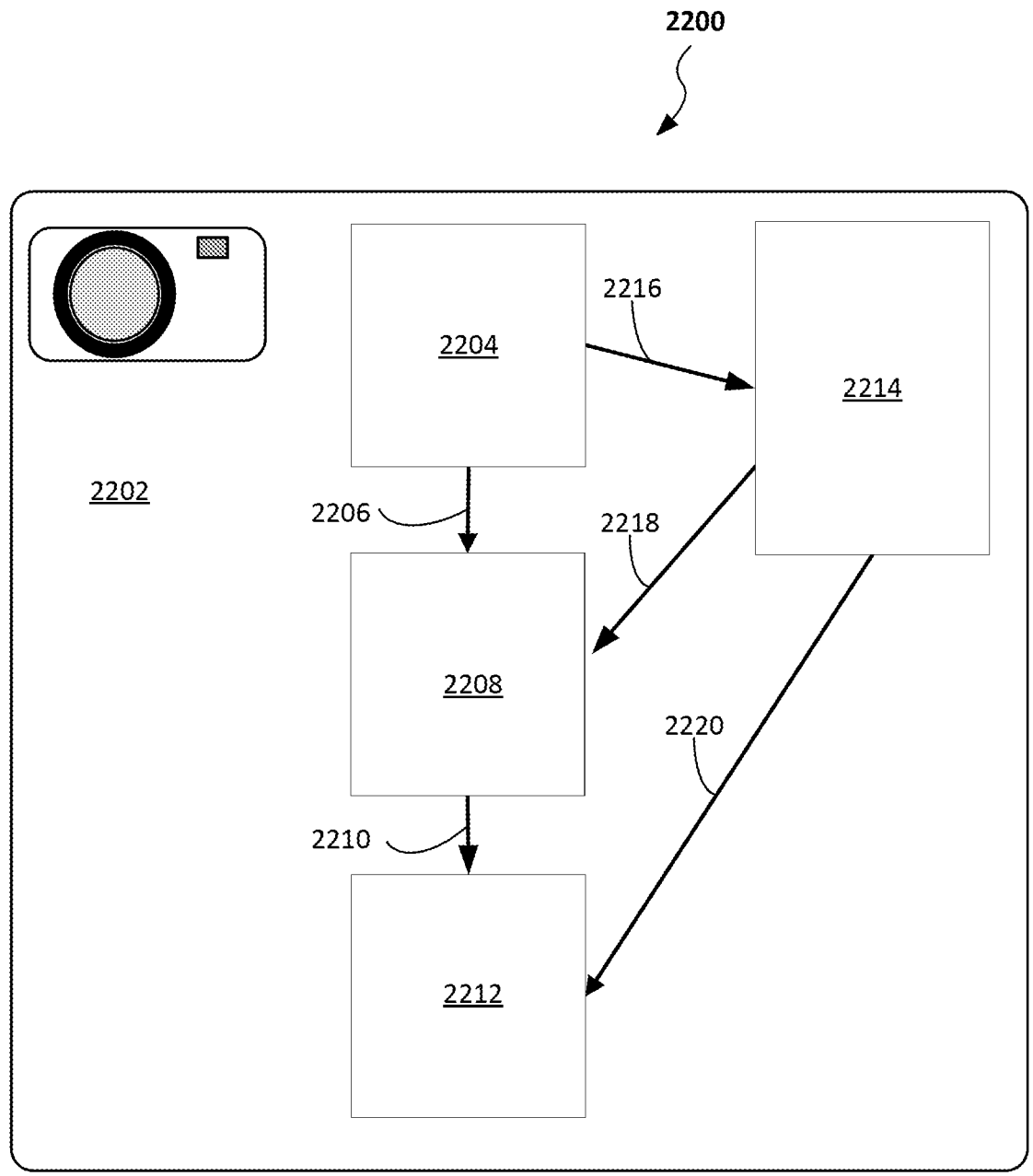
FIG. 22 is schematic illustration of an exemplary flow process implementing a secure digital asset signature.

FIG. 22 is schematic illustration of an exemplary flow process 2200 implementing a secure digital asset signature. In an exemplary embodiment, process 2200 is implemented within an image capture device 2202. In this example, image capture device is similar to secure digital asset production, processing, and storage system 2100, FIG. 21, above. Process 2200 includes an image capture subprocess 2204 (e.g., utilizing a CMOS or CCD device). In some embodiments, image capture subprocess 2204 includes the additional capture of contextual information relating to a captured image 2206, including without limitation, a time and date of capture, a camera ID (e.g., from a device certificate), a user or owner ID, geographic data from a GPS device integral or in communication with image capture device 2202, a MAC and/or IP address, similar identification information from other devices with which image capture device 2202 may be connected, associated, or in communication. In one embodiment, the contextual information is stored with the metadata, which may further include the name of captured image 2206, as well as its exposure, color depth, and other controls.

Captured image 2206 is input to a signature subprocess 2208, which then outputs a signed image 2210 to storage subprocess 2212, which saves (or alternatively transmits) signed image 2210 as a file package together with the image metadata. A hashing subprocess 2214 is configured to be in functional communication with one or more of subprocesses 2204, 2208, and 2212. In the exemplary embodiment, hashing subprocess 2214 is in functional communication with all three subprocesses 2204, 2208, and 2212. Hashing subprocess 2214 implements cryptographic hashing into flow process 2200 to advantageously provide levels of security and provenance reliability to a digital asset distribution and usage ecosystem (see FIG. 24, below) that are not achieved by conventional asset capture and authentication systems. In an alternative embodiment, each of subprocesses 2204, 2208, 2212, and 2214 correspond to electronic modules, devices, or units configured to execute the respective subprocess, similar to system 2100, FIG. 21.

For example, referring back to the exemplary embodiment of FIG. 22, a hash is used as a digital signature, utilized throughout process 2200, and which is also registered with a blockchain, for example, in order to for the owner of captured image 2206 to more demonstrably prove existence of a captured image, and still further more reliably assert ownership thereof. The cryptographic hashing from hashing subprocess 2214 may further be utilized to reliably demonstrate if and how images may have been altered, beyond merely being able to prove the time the pictures were taken, or in some cases at least, "taken no later than date X."

Hashing subprocess 2214, which, in some embodiments, is considered to be "a hash algorithm," should be selected so as to minimize impact on camera functions such as processing time, but without sacrificing security gained by the addition of hashing subprocess 2114 to flow process 2200. In specific examples, hashes from the SHA-2 family may meet requirements of specific cameras, whereas hashes from the SHA-256 family may be more universally adapted to a wider range of devices and applications. Word size is often a primary performance consideration, and embedded cryptographic modules that merely exhibit high performance hash functions are known to be conventionally available.

In an exemplary embodiment, preliminary metadata is included with an image hash 2216 of captured image 2206. This novel and advantageous combination adds particular value and security to the image, creation, processing, and storage subprocess of flow process 2200, which is not provided by conventional systems or methods. In the exemplary embodiment, flow process 2200 utilizes additional metadata that further includes, without limitation, one or more of the time and date stamp on captured image 2206, the hardware ID (e.g., device/camera) and, if networked, the network address (e.g., Ethernet MAC). In some embodiments, hashing subprocess 2214 combines both the preliminary metadata and additional metadata with image hash 2216 to output one or more of a first signature hash 2218 and a second signature hash 2220.

In an embodiment, the hardware ID is a cryptographic device certificate, such as X.509, or alternatively, a GSMA-based identity. In embodiments where GPS information is available to system 2200, a timestamp from the GPS signal may be utilized in the metadata, and image hash 2216 and/or signature hashes 2218, 2220 may include the location information from the GPS. Subsequent assertion of ownership rights may be further reinforced and/or strengthened if one or more of the hashes further includes an owner ID, which may also be a cryptographic certificate. Optionally, if image capture device 2202 is networked, the respective addresses of associated connections may also be included with one or both of signature hashes 2218, 2220, in order to further improve the "reputation" value of the respective hash. In at least one embodiment, hashing subprocess 2214 includes all available metadata with image hash 2216 at or near the time of operation of image capture subprocess 2204.

In an exemplary embodiment, image hash 2216 includes, without limitation, one or more of the hash of the unprocessed image, the hardware certificate of device 2202, the hardware address (e.g., in an embodiment where image capture device 2202 is networked), the owner certificate or other account credentials, a timestamp (e.g., from a GPS source, if available), a location from a GPS source, and available network associations at the time of operation of image capture subprocess 2204. In the exemplary embodiment, image hash 2216 is created at the time of image capture (e.g., operation of image capture subprocess 2204), and may then be included, by hashing subprocess 2214, as a portion of the processing (e.g., signature subprocess 2208) by any and all of the processing components of image capture device 2202, to be encoded into the image format that is subsequently and/or transmitted in storage subprocess 2212. In some embodiments, such encoding utilizes steganography. In alternative embodiments, the encoding utilizes unused areas of the encoding format so as to avoid interference with data capture of the actual image. In at least one embodiment, the encoding process utilizes both steganography unused encoding format areas. Once encoded, the hash is added to metadata.

As illustrated in FIG. 22, as an image traverses system 2200 and its several subprocesses, hashes (e.g., by hashing subprocess 2214) may be combined with additional data, such as secure time information and Merkle trees, or similar cryptographic structures that may be subsequently produced. According to this advantageous implementation of hashing subprocess 2214, later alterations and/or usage of either captured image 2206 or signed image 2210 may be securely tracked. In an exemplary embodiment, one or both of captured image 2206 and signed image 2210 are registered utilizing one or more blockchains, according to an in the embodiments described above. Clients that the subsequently view or process one or more of the respective images may then consider the combination of metadata with hashing to more reliably verify encoded usage of the respective image, as well as related ownership rights than can be achieved according to conventional encoding and tracking systems. According to this advantageous embodiment, the hashed metadata information (included with a captured digital asset) is significantly more reliable as proof of asset ownership, and transcendent of actual possession of the captured asset.

These advantageous systems and methods utilize recent advances in the physical speed, ease of integration, and processing rates of cryptographic modules (e.g., hardware, associated firmware, and associated software) to integrate the cryptographic functions described herein. Specifically, system 2200 is configured to implement cryptographic hashing of image/asset contents in near real time at any or all stages of image capture, processing, and storage. These novel hashing subprocesses thus allow for digital signatures to be created throughout the entirety of process 2200, and such digital signatures can be registered, for example, with the immutable ledger of a blockchain, and reliably conveyed with the respective image. In an exemplary embodiment, one or more of the created digital signatures are embedded into the image file using encoding or steganography methods. In some embodiments, the digital signature(s) is also included in the metadata.

As illustrated in FIG. 22, in the exemplary embodiment, instead of a single hash, two distinct hashes can be computed: (1) image hash 2216 on the "raw" image before processing (e.g., captured image 2206); and (2) signature hash 2218, 2220 on the image during or after processing (e.g., signed image 2210). In some embodiments, the respective hash further includes CAC metadata to further improve both the security and value of the hash. CAC metadata may include, for example, data regarding usage and ownership rights, as described above, along with other data, as described below. Systems and methods according to these embodiments thus realize significant advantages over conventional systems, which authenticate an image after completion of processing and storage/transmission of the final image file.

Figure 23:
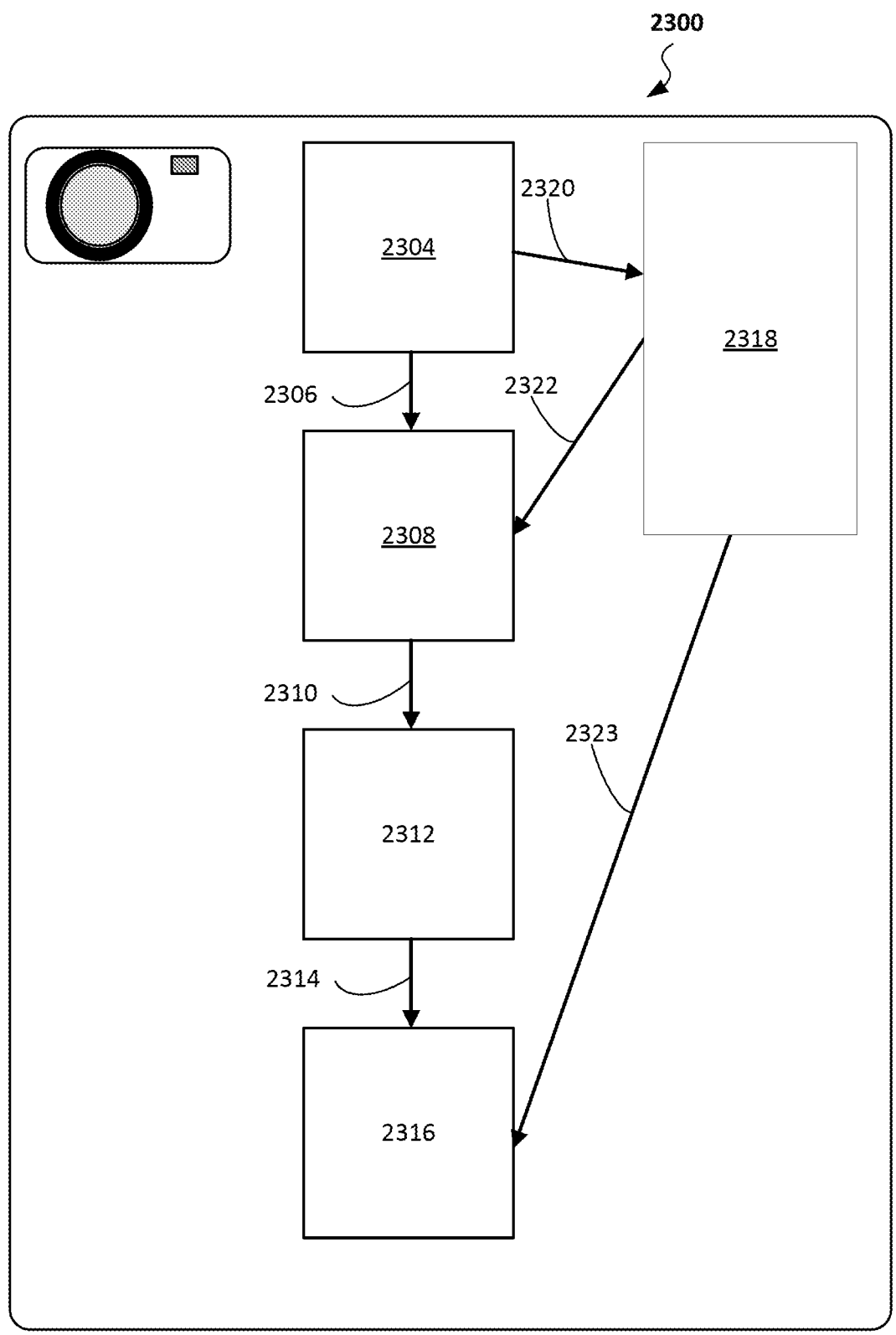
FIG. 23 is schematic illustration of an exemplary flow process implementing encryption with the process depicted in FIG. 22.

FIG. 23 is schematic illustration of an exemplary flow process 2300. Flow process 2300 is similar to flow process 2200, FIG. 22, above, except that process 2300 further integrates encryption into an image capture device 2302 such that images are encrypted before being stored, in order to provide additional reliability and control of the digital signature implementation.

More particularly, in an exemplary embodiment, process 2300 includes an image capture subprocess 2304, which may be similar to subprocess 2204, FIG. 22, described above (e.g., type of device, capture of contextual information, metadata, etc.). Subprocess 2304 produces a captured image 2306, which is input to a signature subprocess 2308, similar to signature subprocess 2208, FIG. 22, above. Signature subprocess 2308 then outputs a signed image 2310. An encryption subprocess 2312 then encrypts signed image 2310 and outputs encrypted image data 2314 to storage subprocess 2316, which saves (or alternatively transmits) encrypted image data 2314 as an encrypted file package together with the image metadata.

Similar to process 2200, process 2300 includes a hashing subprocess 2318, which is configured to be in functional communication with one or more of subprocesses 2304, 2308, and 2316. In the exemplary embodiment, hashing subprocess 2318 is in functional communication with all three subprocesses 2304, 2308, and 2316. Hashing subprocess 2318 implements cryptographic hashing into flow process 2300 to advantageously provide levels of security and provenance reliability to a digital asset distribution and usage ecosystem (see FIG. 24, below) that are not achieved by conventional asset capture and authentication systems.

Similar to process 2200, FIG. 22, above, in an exemplary embodiment process 2300 also utilizes a hash with a digital signature, which is then registered with a blockchain. In the exemplary embodiment, preliminary metadata is included with an image hash 2320 of captured image 2306, and flow process 2300 utilizes (or includes with the preliminary metadata) additional metadata that further includes, without limitation, one or more of the time and date stamp on captured image 2306, the hardware ID (e.g., device/camera) and, if networked, the network address (e.g., Ethernet MAC). In some embodiments, hashing subprocess 2318 combines both the preliminary metadata and additional metadata with image hash 2320 to output one or more of a first signature hash 2322 and a second signature hash 2324.

Also similar to process 2200, above, in an embodiment of process 2300, the hardware ID is a cryptographic device certificate, such as X.509, or alternatively, a GSMA-based identity. In embodiments where GPS information is available to system 2300, a timestamp from the GPS signal may be utilized in the metadata, and image hash 2216 and/or signature hashes 2322, 2324 may include the location information from the GPS. Optionally, if image capture device 2302 is networked, the respective addresses of associated connections may also be included with one or both of signature hashes 2322, 2324. In at least one embodiment, hashing subprocess 2318 includes all available metadata with image hash 2320 at or near the time of operation of image capture subprocess 2304.

In an exemplary embodiment, image hash 2320 includes, without limitation, one or more of the hash of unprocessed image 2306, the hardware certificate of device 2302, the hardware address, the owner certificate/account credentials, the timestamp, the location, and the available network associations at the time of operation of image capture subprocess 2304. In the exemplary embodiment, image hash 2320 is created at the time of image capture, and may then be included, by hashing subprocess 2318, as a portion of any and all of the processing components of image capture device 2302, to be encoded into the image format that is subsequently and/or transmitted in storage subprocess 2316. As described above, in some embodiments, encoding utilizes steganography and/or unused areas of the encoding format so as to avoid interference with data capture of the actual image.

In further operation of process 2300, hashes 2320, 2322, 2324 (e.g., by hashing subprocess 2214) may be combined with additional data, such as secure time information and Merkle trees, or similar cryptographic structures that may be subsequently produced. In an exemplary embodiment, one or more of captured image 2306, signed image 2310, and encrypted image data 2314 are registered utilizing one or more blockchains, according to an in the embodiments described above. In the exemplary embodiment, encryption subprocess 2312 is executed prior to execution of storage subprocess 2316. In some embodiments, signed image 2310 is input to an encryption module (e.g., hardware or software executing encryption subprocess 2316) prior to storage/transmission.

In an embodiment, encryption may be implemented within a digital image system (e.g., image capture device 2302) as follows: (1) an image is captured (e.g., by image capture subprocess 2304) utilizing a CMOS or CCD sensor; (2) contextual information is captured (e.g., also by image capture subprocess 2304, or by another subprocess) including, without limitation, the time, date, device ID, user ID, locational GPS data, a MAC and/or IP address, association information related to other devices to which the camera is connected or in communication; and (3) perform an operation $\lambda$ on one or more of the image and contextual information to determine a characteristic value $\psi$.

In some embodiments, encryption subprocess 2312 is optimized according to cost and performance requirements of image creation for specific applications. For example, the operation $\lambda$ may be initially simplified to collect a sum of values $\Sigma x(y)$ in each x coordinate for every y row of captured image (e.g., captured image 2306), and then multiply each of the sums together, creating the characteristic value $\psi$. In some cases, the operation $\lambda$ may include a modulo of $\psi$ using either a static (and safeguarded) or calculated divisor n. In another example, operation $\lambda$ is calculated by obtaining the values of specific key coordinate points in the x/y matrix of captured image 2306, and then performing an operation on those key points. This second example may result in a faster approach, but may not as easily detect changes to pixel values that are not tracked.

In a further example, the characteristic value ii may also be determined by hashing the entire image. This approach may be optimal for systems able to utilize more time, computational resources, and power necessary for the calculation of the hash. In some instances, the hash itself may be sufficient for encryption. In some embodiments, the hash may be utilized for the search/lookup of images signed according to process 2300 (or process 2200, FIG. 22). Where an image has been altered (e.g., changes in color one or more pixels), the respective hash will change. Nevertheless, as described above, the combination of the hash with other contextual information/metadata, as well as utilization of signature processing and blockchain registration, will still allow tracking of the image even when so altered. These examples are provided for illustration purposes, and are not intended to be limiting. Furthermore, one or more of examples described herein may be implemented together for encryption purposes, depending on the ability of the asset processing system to absorb the resulting increased complexity, as well as the additional time that may be required to determine the characteristic value $\psi$.

According to the embodiments of FIG. 23, the additional encryption of the signed image further strengthens both the authenticity and the confidentiality of the image. In some embodiments, where speed is a concern relating to storage or transmission, encryption may be performed by block-cipher-mode (BCM). In such circumstances, a counter (CTR) mode may also be implemented to allow for parallelization of encryption operations. Parallelization, for example, allows each block to be encrypted independently, as opposed to other BCM operations that require serial encryption and propagation of material from a previous block for encryption of the next block. In some embodiments, secure key storage and a hardware-based trusted platform module (TPM) are implemented in combination with one or more of the operations. In one embodiment subprocess 2300, encryption is performed on captured image 2306 prior to, or without performing signature of the image.

Figure 24:
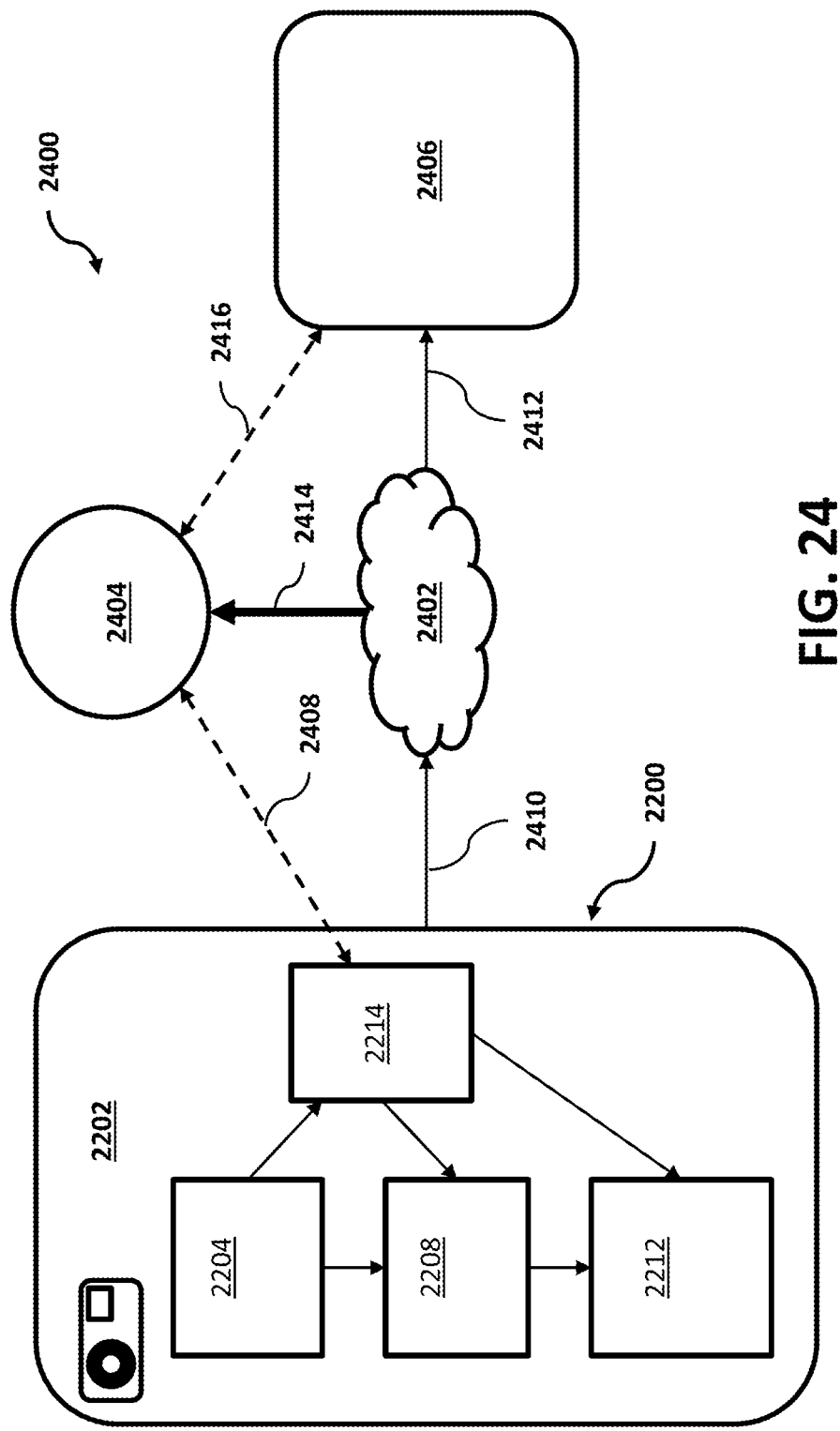
FIG. 24 is schematic illustration of an exemplary digital asset security ecosystem for the system process in FIG. 22.

FIG. 24 is schematic illustration of an exemplary digital asset security ecosystem 2400, which can be implemented with process 2200, FIG. 22. In an exemplary embodiment, ecosystem 2400 includes a media distribution, transmission, network 2402, a registry 2404, and a media viewer 2406. In one embodiment, network 2402 is the Internet, or an equivalent electronic network capable of performing media distribution, transmission, and/or storage (e.g., the Cloud). Media viewer 2406 is, for example, a client application, a browser, display device, or an equivalent electronic device or software application configured to allow viewing of distributed asset content.

In an exemplary operation of ecosystem 2400, an image hash (e.g., hash 2216, 2218, or 2220, FIG. 22) is submitted as a transaction 2408 to registry 2404 for ID certification and/or image registration. Registry 2404 is, for example, a server or secure database, and configured to provide a distributed ledger solution based on blockchain technology. In an exemplary embodiment, the hash is transmitted at one or more of the time image 2206 is captured (e.g., from image capturing process 2204), at the time image capture device 2202 is networked with ecosystem 2400, and any time an image (e.g., signed image 2210) is transferred from image capture device 2202. In an embodiment, a secure mechanism (not shown) is employed to ensure that an image, its metadata, and its associated hash are created prior to registration. Such a secure mechanism may be, for example, a hardware or software solution within hashing subprocess 2214.

In an exemplary embodiment, registry 2404 further serves to function as a certification server, and is configured to associate registered images with an appropriate user or device certificate. In this embodiment, registry 2404 thus further operates as the focal point for secure assertion of usage rights and related queries. In operation, media (e.g., signed image 2210) is distributed, transmitted, and/or stored over and on network 2402 as a first distribution 2410, and then to media viewer 2406 as a second distribution 2412. At intermediate points (not shown) in first and second distributions 2410, 2412, a time stamp can be applied, and the image file may be rehashed as a plurality of transaction reports 2414. Each such additional operation may be encoded into the metadata, for example, as a Damgard-Merkle structure, with the root of the structure being the original image hash (e.g., hash 2216) created at time of image creation. Within this exemplary operation, media viewer 2406 is capable of performing an interaction 2416 directly with registry 2404 for asset verification and/or licensing. In an embodiment, interaction 2416 may be indirect, and performed through network 2402.

According to the system and method of ecosystem 2400, an advantageous end-to-end digital image security solution is provided that allows the coordination of user and device certification, image registry, and image tracking. An exemplary embodiment, the end-to-end solution of ecosystem 2400 is further combined with a blockchain secure content ledger solution capable of managing asset distribution and rights management, such as the blockchain solutions described above.

Ecosystem 2400 is therefore particularly advantageous with respect to its ability to serve as an easily accessible focal point for large content providers, small content providers, or individuals creating digital assets. Individuals among the general public, for example, through ecosystem 2400, are better able to prove, or at least strongly assert, ownership and control of the assets they produce and disseminate. Professional photographers and cinematography professionals may more easily control and prove ownership of their own original imagery. Media distributors can more easily measure and track the distribution and viewing/usage of their distributed content. Digital artists may more easily digitally sign and encrypt their own original digital works (e.g., computer created). These examples are merely illustrative, and are not meant to be limiting.

Furthermore, the embodiments described herein are particularly applicable to particular use cases, for example, where the digital asset is video. As referred to herein, "video" refers to the composite of motion image frames in sequence with synchronized audio and, in some instances, metadata as well. Where the digital asset involves production video distribution, security of the asset may include application of digital signatures to one or more of the motion images, the audio, and the entire composite, as well as encryption at any or every stage therein.

In one exemplary embodiment, encryption and digital signatures may be applied to video content as follows: (1) an image is captured (e.g., by image capture subprocess 2204, 2304) utilizing a CMOS or CCD sensor; (2) contextual information is captured (e.g., also by image capture subprocess 2204, 2304, or by another subprocess) including, without limitation, the time, date, device ID, user ID, locational GPS data, a MAC and/or IP address, association information related to other devices to which the camera is connected or in communication; (3) for each frame τ of the video, the associated x/y grid is transposed into an n×n matrix A (Aτ); and (4) the eigenbasis $\mathbb{C}$n of the matrix A is calculated. These steps are described for illustration purposes, and are not meant to be limiting. Alternative or additional operations may be implemented for encryption and/or digital signatures of digital video assets. The eigenbasis $\mathbb{C}$n, for example, may be derived across multiple frames, calculated based on some interval of τ, and/or hashed with contextual information for increased provenance value.

As described above, the advantageous systems and methods herein are applicable to general digital assets, and not exclusively to digital images and videos. All such general digital assets, according to the present embodiments, are thus capable of implementing digital signatures utilizing identifying metadata with the processed asset prior to storage at or transmission from the point of origin (e.g., asset capture/creation device or application). Once created, the digital signature may be registered on a secure registration system, such as that employing immutable blockchain technology. The systems and methods thus achieve significant advantages over conventional approaches.

In conventional systems, signatures can be created after the fact, as can be the associated contextual data. Providing a system for registering images in real time, or near-real time, the present embodiments allow for improved provenance value of the digital signature. "Near-real time" refers to an as-soon-as-possible registration approach, which realizes increasing value the closer the signature occurs to the actual real time creation of the asset. For example, the longer the period is between creating and signing an asset, the greater the opportunity is to "forge" a signature to the asset.

In order to register an asset as having been created at a given time, the clock on digital camera, for example, is not trustworthy because it can be altered. According to the present systems and methods, as a proxy for a globally trusted timestamp, the created asset is instead registered with an immutable, fault-tolerant, distributed register which can be searched for provenance verification. That is, a blockchain is implemented to cryptographically assure the authenticity of the asset, its time of commit/creation, its creator/owner, and rights associated with the asset.

In some embodiments, for digital image/video assets, images or video frames from a camera may be stored locally, and then serialized over in associated network. In other embodiments, the images/video frames may be directly streamed immediately after encryption. Where blockchain technology is implemented with these embodiments, the values stored in the related blockchain transaction may include one or more of, without limitation: standard Exif image tags; a thumbnail of the image or a summary image for a video; the characteristic value ψ (for still images); the eigenbasis $\mathbb{C}$n (for video); a public hash of the image; the time of creation (e.g., as conveyed by Exif); the time of commit (e.g., as attestable by the blockchain); additional details of the blockchain, which may be managed elsewhere; and a verification of an image as being registered. In an embodiment, the registration verification may also be managed elsewhere (e.g., registry 2404, FIG. 24). Nevertheless, registration verification may still be advantageously cryptographically assured through the blockchain.

The present embodiments are further applicable to a variety of different electronic image capture devices, such as: CCTV cameras, which typically include a single SoC board onto which the sensor is directly mounted; camera systems that leverage SoC design or have a modular integration, digital single-lens reflex (DSLR) cameras capable of capturing images at a sustained rate of several frames per second with no limit on the burst size (other than available storage media); professional production cameras for high-resolution real-time video; and standard security cameras the typically include significantly simplified optical systems.

Applicable camera formats include 960H, HD-CVI, ccH-Dtv, HD-MDI, HD-SDI, and HD-TVI. In some embodiments, digital video recorders may provide connectivity from the camera to the associated electronic network. The present embodiments may further be integrated with Analog High Definition (AHD) standards, as well as those pertaining to the Open Network Video Interface Forum (ONVIF) and/or the Physical Security Interoperability Alliance (PSIV). The present DASe embodiments thus improve the ability of security systems prove provenance and track image dissemination, which is of particular use to establish chain of custody, which is a significant consideration when employing CCTV systems as evidence for legal purposes.

In video security embodiments (both home and law enforcement), video evidence may be deemed inadmissible because a digital chain of custody could not be proven. That is, the video evidence cannot be substantially proven to have been free from tampering. In an example, a portion of digital CCTV evidence may be captured, each transfer from one person or device to another person/device (i.e., custody) must be documented and incontestable with respect to any other possession. For digital data, the chain must show that the information of the asset was properly copied, transported, and stored, and that the electronic information has not been changed. Moreover, all media must have been secured throughout the collection of the evidence. Through implementation of a system such as ecosystem 2400, production evidence can be more easily compared with the originally captured asset in order to verify whether there have been any changes to the digital asset between its capture and production.

The DASe/DISe embodiments of the present application are particularly applicable with respect to body worn cameras. In body cameras, the sensor and lens elements may be located remotely from the associated processing and storage elements. A body camera may be capable of networking, but generally performs storage onboard, and then his later synced with an evidence management system. Video resolution is usually HD (at least 720p), but storage is highly compressed (e.g., 8-20 hours of video), and battery life is typically 2-6 hours. The present systems and methods are therefore capable of implementation onboard, without significantly reducing resolution, storage capabilities, or battery life. Similar to the security systems example described immediately above, provenance of images recorded by body cameras is a significant legal concern when the body cameras are used for law enforcement purposes. These considerations may also be significant with respect to home security systems, as well as imaging/video systems utilized in public or private transportation vehicles.

According to the present embodiments, DASe implementation provides an advantageous solution that enables digital signing of still or video images (or other digital assets), encryption of the image or video stream, and transmission of the image and digital signing data. The present DASe implementations provide this solution without significantly adversely affecting the power requirements of the asset capture system, its heat dissipation requirements, or the physical space for additional circuitry, since many of the elements described above can be implemented within software applications of existing physical components.

The present systems and methods are further applicable to an image capture device that connects to a network through, for example, a CSI-2 bus, one utilizing TCP/IP packets, a circular buffer file, or in output stream to the Internet. The DASe embodiments herein are applicable to image capture and processing utilizing, without limitation, the following formats: JPEG, RGB, OpenCV/Planar BGR, YUV, and H.264. To perform processing on video frames after capture, a queue of objects may be maintained to store the frame captures, and parallel threads may then accept and process the ongoing captured streams. In some embodiments, the digital signature and encryption embodiments herein utilize certificate based identity management (e.g., X.509), SHA-256, ECC based PKI, and AES-128 which may be enabled by one or more TPMs to better ensure security. Some conventional field-programmable gate arrays (FPGAs) implement encryption technology, but include none of the additional security features described herein, nor utilize integrated TPMs.

In some embodiments, Python encryption may be implemented, including one or more of Cipher Block Chain (CBC) and Propagating Cipher Block Chain (PCBC) applications. According to this approach, captured images from a camera may be represented as byte strings and the strings may then be encrypted, for example, through AES CBC mode encryption, utilizing a 16, 24, or 32 byte key (byte string) and a randomly generated initialization vector. In this approach, last block is padded to the chosen block size. To decrypt the image, the encrypted string, initialization vector, and number of padding bytes are transmitted, and the received transmission can then be decrypted according to the known key.

CBC employs an initialization vector against which the first block of plaintext is subjected to an XOR operation, and then encrypted. The next block of plaintext is then "XORed" against the last encrypted block before encrypting the current block. Because CBC encryption is vulnerable (subject to attack by sophisticated hackers) if the initialization vector can be determined, the additional security features provided according to the present embodiments are particularly advantageous to protect the CBC operation from discovery and/or undesired changes. CBC encryption/decryption can be performed by: obtaining an image (e.g., from a camera) in string form; encrypting the obtained string (assuming the key is a known value, such as a sequence of 16, 24, or 32 characters, or a hash generated randomly or from a passphrase); generate an initialization vector using a random number generator; pad the string so that its length is evenly divisible by the block size, and record the number of bytes used for padding; encrypt the string; return the encrypted string, number of padding bytes, and the initialization vector; transmit the encrypted representation of the image along with the number of padding bytes and the initialization vector; on the receiving end, decrypt the image string; remove the padding bytes; decrypt the string using the initialization vector and the key; and convert the decrypted string to an image using the transformation appropriate for the camera acquisition.

According to the embodiments herein, the CBC procedure can be implemented for a sequence of frames, by using Python utilities to serialize and de-serialize the "packets", which include the encrypted string, the number of padding bytes, and the initialization vector. In an exemplary embodiment, the hash algorithm is selected to ensure minimal impact on camera processing time while being sufficiently secure (e.g., SHA-2, SHA-256).

PCBC operations are generally less vulnerable to attack than are CBC operations, due to the capability of making changes in the ciphertext such that it may propagate indefinitely when both decrypting, and when encrypting. In PCBC mode, each block of plaintext is XORed with both the previous plaintext block and the previous ciphertext block before being encrypted. As with CBC mode, an initialization vector is used in the first block. The Python code to implement PCBC is similar to the CBC example, with the addition of code to alter the ciphertext block prior to transmission of each successive frame.

The present DASe embodiments are also advantageous when implemented, for example, with a Pi camera API, which includes an annotation facility which permits up to 255 characters of ASCII text to be overlaid on all output (including the preview, image captures and video recordings), which allows for the encryption of images with a human-readable string superimposed on the image. When utilized in coordination with the blockchain and asset security embodiments described above, a more secure time/date stamp and camera location may be reliably registered, as well as additional arbitrary characters that could be used for a form of digital signing.

According to the systems and methods described herein, DASe implementation is applicable to all forms of digital assets and distributed content. These DASe the embodiments, irrespective of the particular digital asset, are capable of achieving the following novel and advantageous elements, each of which may be executed independently or in combination with any of the others: (i) the encryption of the asset onboard the digital asset capture/creation device prior to storage of the asset; (ii) the digital signing/cryptographic hashing of the asset onboard the digital asset capture/creation device prior to storage; (iii) the registration of the asset using a secure transactional database or distributed ledger such as a blockchain; (iv) the combination of metadata with the cryptographic hash that more reliably demonstrates ownership; (v) the use of a secure transactional database or distributed ledger, such as a blockchain, to track transmission, storage, and transfer of assets as the assets traverse networks; (vi) the capability to assert ownership/provenance rights using metadata attached to the asset at the time of asset creation, in further in combination with encryption and/or digital signature operations to better control and convey usage rights of the digital signature.

Through implementation of the present DASe and DISe embodiments, an ecosystem of individuals or organizations is better able to protect digital assets from being used, viewed, distributed, altered, or tampered with, without permission of the owner or creator of the asset. Additionally, the content registry capabilities of the ecosystem described herein further supports a continuous digital chain of custody for legal purposes (e.g., ownership or evidentiary). Prior registry of a digital video home security system with a DASe ecosystem, for example, may allow any video evidence collected by the home security system to be verified according to the same standards employed by law enforcement security systems.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A digital asset ecosystem, comprising:
an electronic processing device configured to (i) capture an unprocessed form of a digital asset at a first time of asset capture, (ii) compute a first cryptographic hash for an unprocessed form of the digital asset and for first metadata related to the unprocessed form at the first time of asset capture; (iii) digitally sign the unprocessed form of the digital asset with the first cryptographic hash to generate a signed asset, (iv) submit, at the first time of asset capture, a first transaction to establish provenance of the captured digital asset based on the first cryptographic hash, (v) compute a second cryptographic hash for first metadata captured with the digital asset at the first time of asset capture, (vi) rehash the signed asset with the second cryptographic hash to generate a stored asset, and (vii) submit a second transaction including the second cryptographic hash;
an electronic registry configured to (i) receive the first transaction from the electronic processing device substantially at the first time of asset capture, (ii) register the first transaction on an immutable distributed digital ledger as a first transaction block including the first cryptographic hash, and (iii) append a second transaction block on the immutable distributed ledger after the first transaction block in time order, wherein the second transaction block includes a registration of the second transaction;
an electronic network configured to receive, at a second time subsequent to the first time of asset capture, a combination of the signed asset and the first cryptographic hash from the electronic processing device and distribute the combined signed asset and first cryptographic hash to the electronic media viewer as registered digital content; and
an electronic media viewer configured to (i) verify, with the electronic registry over the electronic network, the registered digital content as verified digital content, and (ii) enable viewing of the verified digital content,
wherein the electronic registry is further configured to, upon distribution of the combined signed asset and first cryptographic hash by the electronic network, append a third transaction block to the immutable distributed ledger after the first transaction block in time order.

2. The ecosystem of claim 1, wherein the electronic network includes the Internet.

3. The ecosystem of claim 1, wherein the electronic media viewer is one of a client application, a browser, an audio display device, a visual display device, and an audiovisual display device.

4. The ecosystem of claim 1, wherein the electronic registry comprises a server including a secure database within the immutable distributed digital ledger.

5. The ecosystem of claim 4, wherein the immutable distributed digital ledger includes at least one blockchain.

6. The ecosystem of claim 4, wherein the electronic registry is further configured to provide a certification for the signed asset based on the first cryptographic hash registered in the first transaction block.

7. The ecosystem of claim 4, wherein the electronic registry is further configured to receive a transaction report from the electronic network for one or more of a plurality of distributions of the combined signed asset and first cryptographic hash.

8. The ecosystem of claim 1, wherein the electronic processing device is further configured to rehash the stored asset with a third cryptographic hash computed for second metadata different from the first metadata.

9. The ecosystem of claim 8, wherein the electronic processing device is further configured to submit a third transaction to the electronic registry for appending onto the immutable distributed digital ledger as a fourth transaction block.

10. The ecosystem of claim 1, wherein the electronic processing device is further configured to (i) process the signed asset by encryption to generate an encrypted asset, (ii) compute a third cryptographic hash for the encrypted asset.

* * * * *